United States Patent
Drahm et al.

(10) Patent No.: US 6,360,614 B1
(45) Date of Patent: Mar. 26, 2002

(54) METHOD AND CORRESPONDING SENSORS FOR MEASURING MASS FLOW RATE

(75) Inventors: Wolfgang Drahm, Erding; Alfred Rieder, Landshut, both of (DE); Alfred Wenger, Neftenbach; Ole Koudal, Reinach, both of (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 09/283,401

(22) Filed: Apr. 1, 1999

(30) Foreign Application Priority Data

Apr. 3, 1998 (EP) .......................................... 98 106 146

(51) Int. Cl.$^7$ ................................................ G01F 1/84
(52) U.S. Cl. ................................................ 73/861.357
(58) Field of Search ..................... 73/861.356, 861.357, 73/861.355

(56) References Cited

U.S. PATENT DOCUMENTS

| | | | |
|---|---|---|---|
| 4,680,974 A | * 7/1987 | Simonsen et al. | 73/861.357 |
| 4,823,614 A | * 4/1989 | Dahlin | 73/861.357 |
| 4,914,956 A | 4/1990 | Young et al. | |
| 5,024,104 A | * 6/1991 | Dames | 73/861.357 |
| 5,044,207 A | * 9/1991 | Atkinson et al. | 73/861.357 |
| 5,321,991 A | 6/1994 | Kalotay | |
| 5,602,345 A | 2/1997 | Wenger et al. | |
| 5,648,616 A | 7/1997 | Keel | |
| 5,705,754 A | 1/1998 | Keita et al. | |
| 5,854,430 A | 12/1998 | Drahm et al. | |
| 6,178,828 B1 | * 1/2001 | Mattar | 73/861.357 |

FOREIGN PATENT DOCUMENTS

| | | |
|---|---|---|
| EP | 0 253 504 | 1/1988 |
| EP | 0 282 217 | 9/1988 |
| EP | 0 803 713 A1 | 10/1997 |
| WO | WO 93/03336 | 2/1993 |
| WO | WO 96/02812 | 2/1996 |

* cited by examiner

Primary Examiner—Harshad Patel
(74) Attorney, Agent, or Firm—Bose McKinney & Evans LLP

(57) ABSTRACT

This method serves to apply the clamp-on design principle to Coriolis mass flow meters and sensors. A first isolating body (4, 4') and a second isolating body (5, 5') having identical masses are fixed to the outside of a pipe (1) or a measuring tube (1', 10, 10', 10'') at a predetermined distance L from each other to define a measuring length forming a pipe or tube section (11; 11'; 11''). These masses are substantially greater than the mass of the pipe or tube section. If two measuring tubes are present, clamping bodies (111, 112; 111', 112') are used. A vibration exciter (12) attached in the middle of the pipe or tube section excites the latter in a third mode of vibration at a frequency f between 500 Hz and 1000 Hz. The distance L is calculated by the following formula:

$$L = 5.5 \cdot 2^{1/2} \cdot (2\pi f)^{-1/2} \cdot \{E(r_a^4 - r_i^4)/(d_M + d_F)\}^{-1/4},$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section.

Two sensing elements (13, 14) are fixed to the pipe or tube section at positions where, if the pipe or tube section is excited in the third mode of vibration, a deflection of the pipe or tube section caused by a disturbance originating from the pipe has a first and a second zero, respectively.

76 Claims, 8 Drawing Sheets

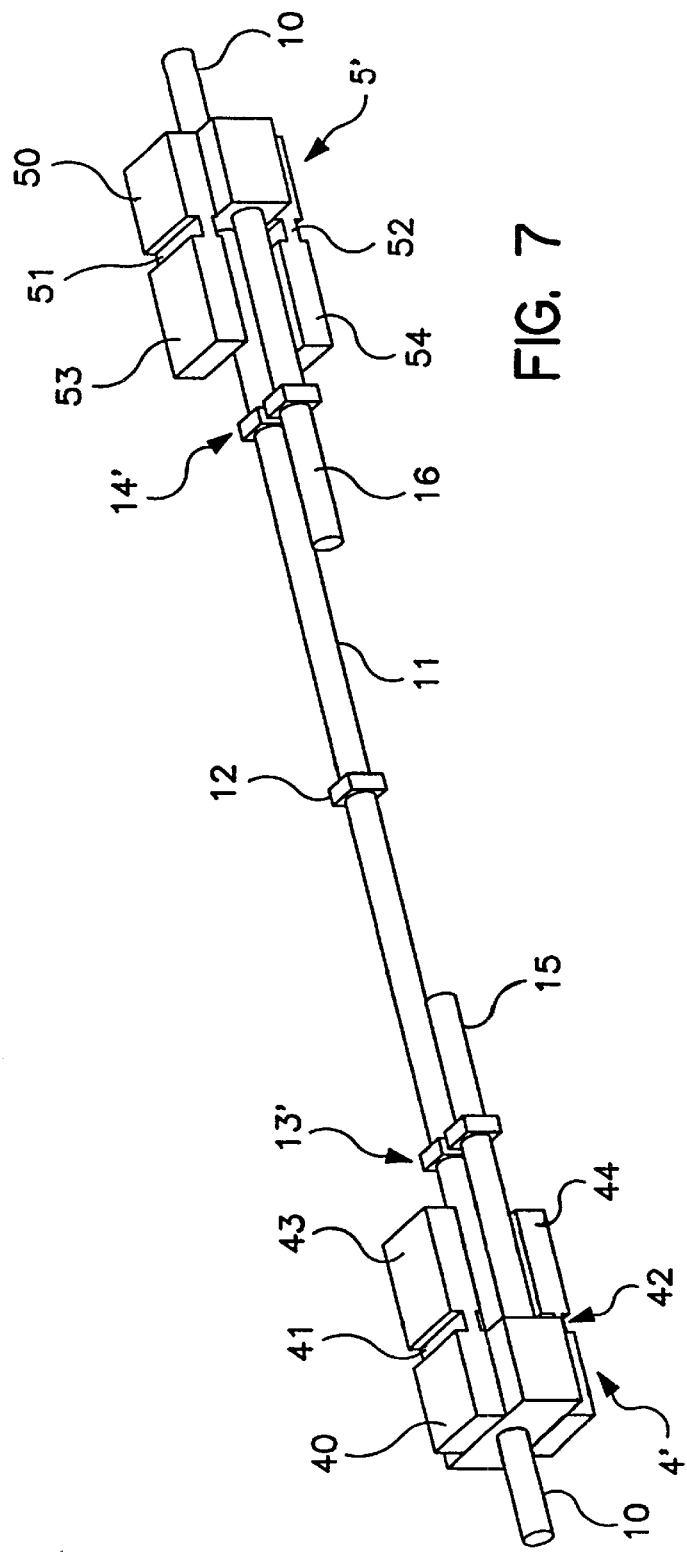
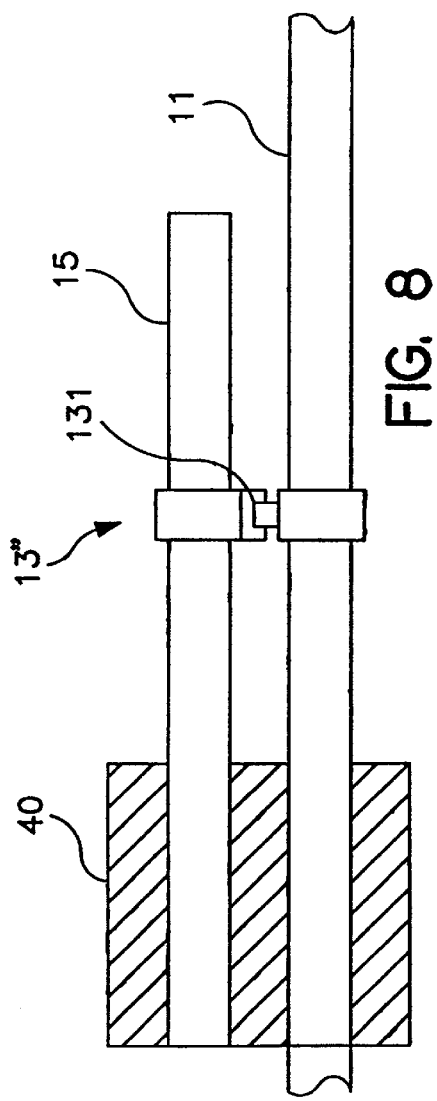

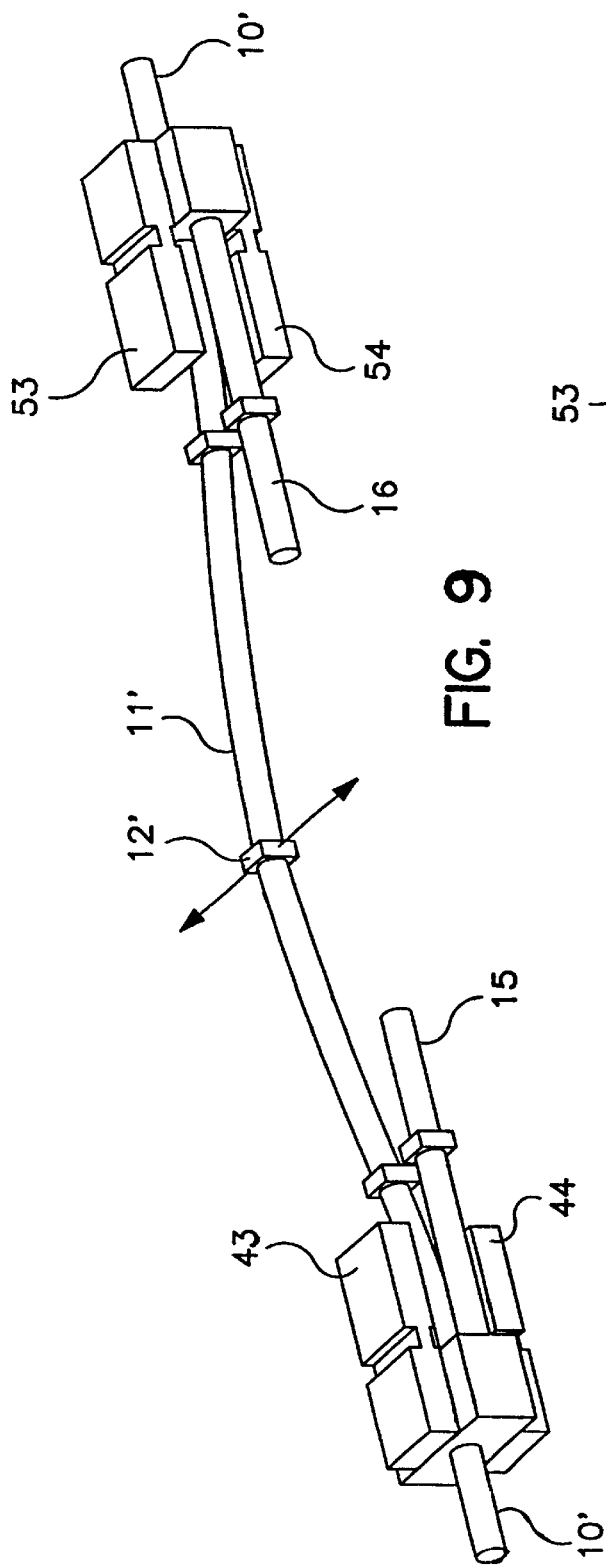
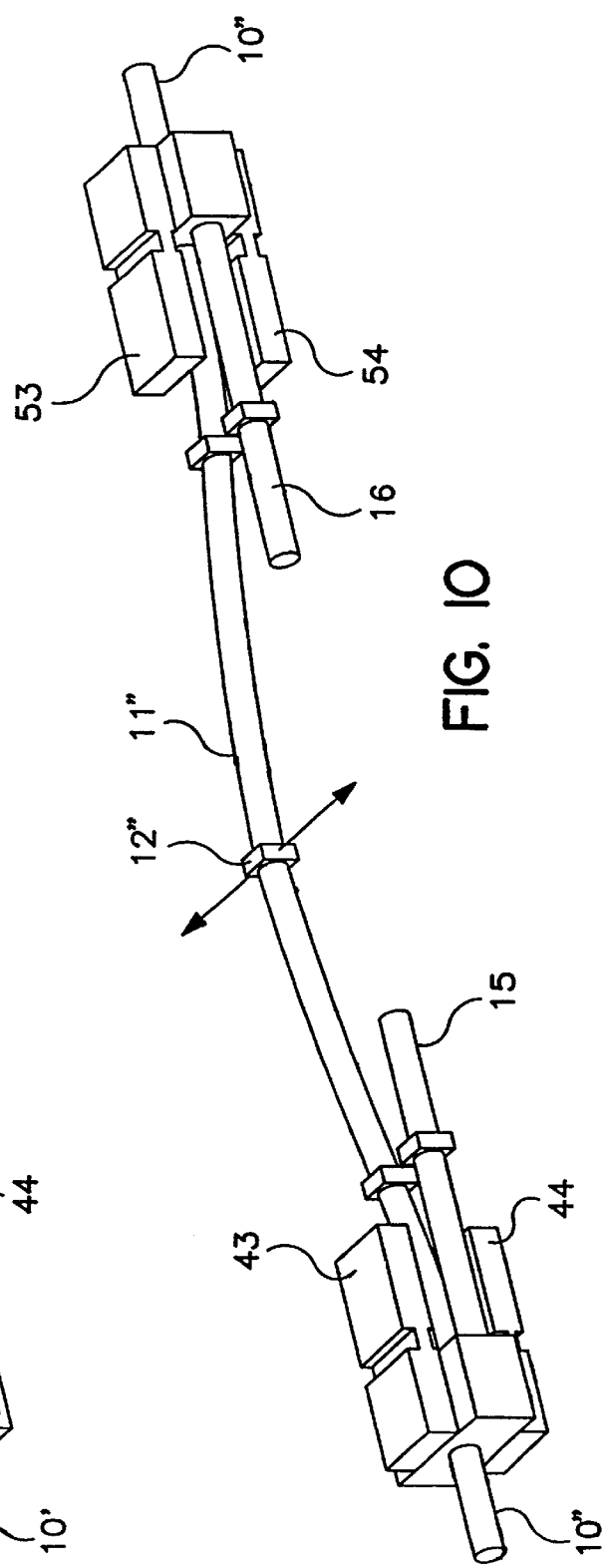

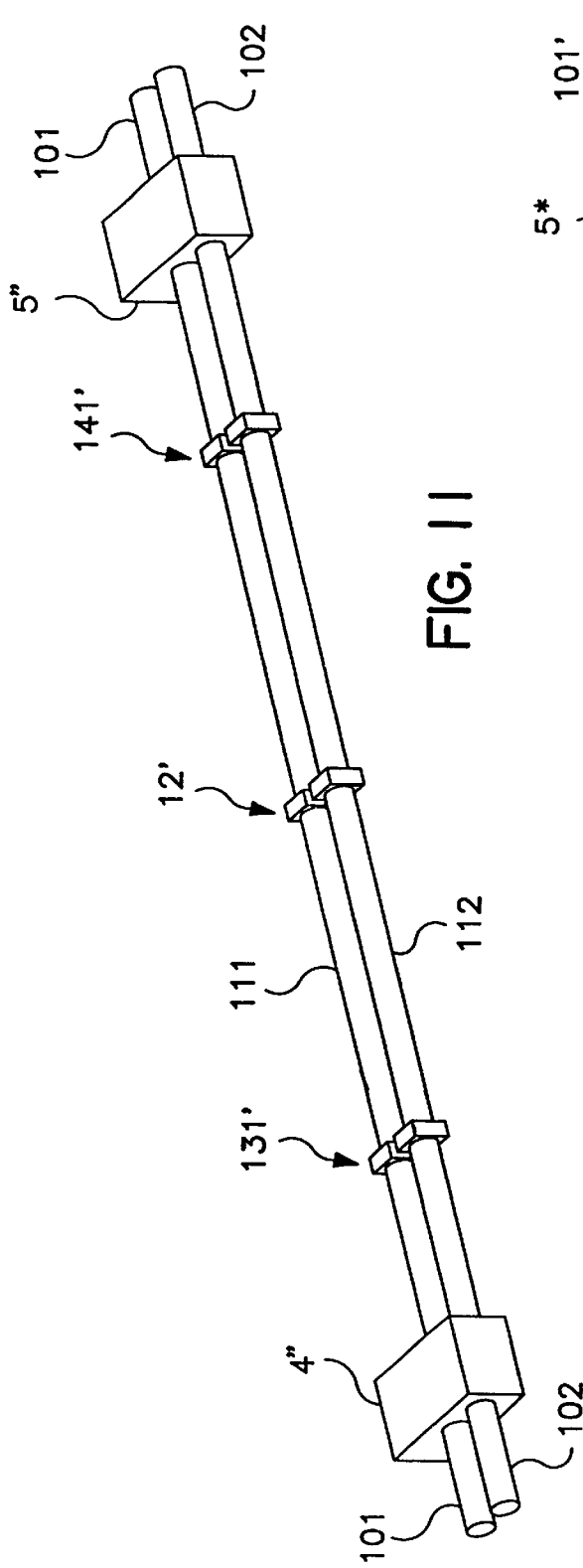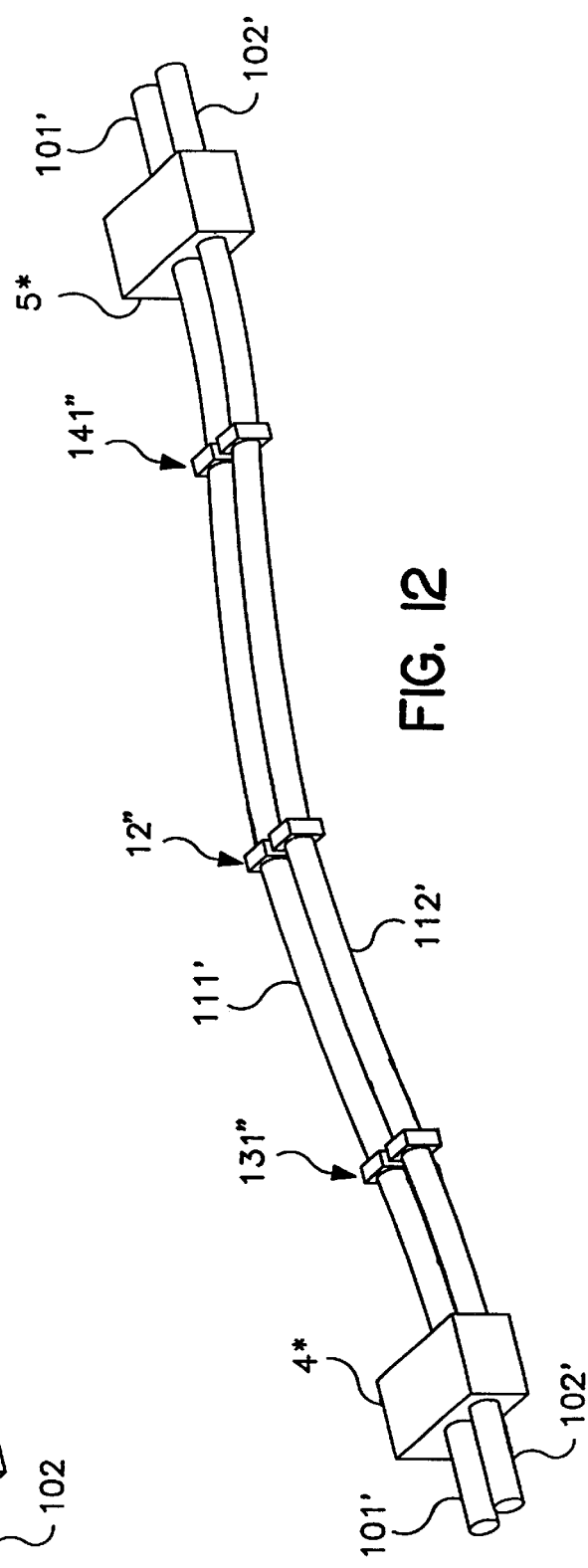

METHOD AND CORRESPONDING SENSORS FOR MEASURING MASS FLOW RATE

FIELD OF THE INVENTION

This invention relates to a method based on the Coriolis principle and to sensors for measuring the mass flow rate of a fluid flowing through a pre-existing, permanently installed pipe, or through a single measuring tube to be inserted into a pipe, on the Coriolis principle.

BACKGROUND OF THE INVENTION

Present-day mass flow sensors of mass flowmeters are manufactured as measuring instruments which are installed by the final customer into a pre-existing pipe in situ.

In the case of one type of ultrasonic flowmeters, i.e., in the case of flowmeters based on a different physical principle of measurement, it has been customary for a long time to secure ultrasonic transmitters and sensors on the external surface of a permanently installed pipe; such devices are commonly referred to as "clamp-on ultrasonic flow sensors".

It is desirable to apply the clamp-on design principle to Coriolis mass flow sensors and flowmeters, so that the mass flow rate of a fluid flowing through a permanently installed pipe can be measured on the Coriolis principle.

U.S. Pat. No. 5,321,991 discloses a Coriolis effect mass flowmeter with a corresponding sensor which is formed by means of an existing, permanently installed pipe through which a fluid flows at least temporarily, the sensor being characterized in that the pipe is fixed to a support at two points spaced a predetermined distance L apart for defining a measuring length forming a pipe section, approximately in the middle of one half of the pipe section, a driver is mounted which excites the pipe section at a frequency f in a second mode of vibration in a first plane containing an axis of the pipe section, either a single motion sensor is mounted in the middle of the pipe section or a first and a second motion sensor are mounted at a distance from each other near the middle of the pipe section, with evaluation electronics deriving a signal representative of the mass flow rate from the amplitude of the single sensor signal provided by the motion sensor or from the amplitude of the sensor signals provided by the two motion sensors, respectively.

Since it evaluates exclusively the amplitude(s) of the sensor signal(s), the prior-art assembly requires a further sensor which is mounted at one of the fixing points to suppress disturbances originating from the pipe and thus achieve sufficient measurement accuracy.

SUMMARY OF THE INVENTION

It is therefore a general object of the invention to improve and refine the clamp-on design principle of Coriolis mass flowmeters in such a way that optimum accuracy is achieved. This general object includes, firstly, that not the amplitudes of the sensor signals are evaluated, secondly, that two spaced-apart sensors are provided, and thirdly, that the measuring length or the length of the vibrating pipe section is precisely predefined. This means that a section of the pipe has to be configured and defined so that it can serve and act as a measuring length.

Another object is to apply the principle underlying the invention for pre-existing and permanently installed pipes to conventional installation Coriolis mass flow sensors, i.e., to make this principle usable in a separately manufactured device which is to be installed into a pipe as a finished mass flow sensor.

The following variants of the invention serve to attain these objects.

A first variant of the method according to the invention provides a method based on the Coriolis principle for measuring the mass flow rate of fluids one of which flows at least temporarily through a pre-existing, permanently installed pipe or through a single measuring tube to be inserted into a pipe, said method comprising the steps of:

fixing a first and a second isolating body having identical masses to the outside of the pipe or the measuring tube at a predetermined distance L from each other to define a measuring length forming a pipe or tube section, each of the identical masses being at least five times as great as the mass of the pipe or tube section;

attaching in the middle of the pipe or tube section a vibration exciter which excites the pipe or tube section in a third mode of vibration, in a first plane containing an axis of the pipe or tube section, at a frequency f which, if the pipe or tube section is filled with one of the fluids, lies between approximately 500 Hz and 1000 Hz;

said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

each of said isolating bodies having a first axis lying in the first plane, a second axis identical with the axis of the pipe or tube section, and a third axis perpendicular to the first and second axes, and having an areal moment of inertia about the first axis which is at least one order of magnitude less than its areal moment of inertia about the third axis;

fixing a first acceleration sensor and a second acceleration sensor to the pipe or tube section at respective positions where, if the pipe or tube section is excited in the third mode of vibration, a deflection of the pipe or tube section caused by a disturbance originating from the pipe has a first zero and a second zero, respectively;

determining a phase difference between a first sensor signal provided by the first acceleration sensor and a second sensor signal provided by the second acceleration sensor; and deriving therefrom a signal proportional to the mass flow rate.

A second variant of the method according the invention provides a method based on the Coriolis principle for measuring the mass flow rate of fluids one of which flows at least temporarily through a pre-existing, permanently installed pipe or through a single measuring tube to be inserted into a pipe, said method comprising the steps of:

fixing a first and a second isolating body having identical masses to the outside of the pipe or the measuring tube at a predetermined distance L from each other, each of the identical masses being at least five times as great as the mass of the pipe or tube section;

attaching in the middle of the pipe or tube section a vibration exciter which excites the pipe or tube section in a third mode of vibration, in a first plane containing an axis of the pipe or tube section, at a frequency f which, if the pipe or tube section is filled with one of the fluids, lies between approximately 500 Hz and 1000 Hz;

said distance L being calculated by the following formula:

$$L=5.5 \cdot 2^{1/2} \cdot (2\pi f)^{-1/2} \cdot \{E(r_a^4-r_i^4)/(d_M+d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

each of said isolating bodies having a first axis lying in the first plane, a second axis perpendicular thereto and identical with the axis of the pipe or tube section, and a third axis perpendicular to the second axis, and having an areal moment of inertia about the first axis which is at least one order of magnitude less than its areal moment of inertia about the third axis;

fixing to the first isolating body an inlet-side first sensor support having a longitudinal axis extending parallel to the axis of the pipe section or the measuring tube;

fixing to the second isolating body an outlet-side second sensor support having a longitudinal axis extending parallel to the axis of the pipe section or the measuring tube;

fixing a first displacement or velocity sensor and a second displacement or velocity sensor to the first sensor support and the second sensor support, respectively, at respective positions where, if the pipe or tube section is excited in the third mode of vibration, a deflection of the first sensor support and the second sensor support caused by a disturbance originating from the pipe has a first zero and a second zero, respectively;

determining a phase difference or time difference between a first sensor signal provided by the first sensor and a second sensor signal provided by the second sensor; and deriving therefrom a signal proportional to the mass flow rate.

A third variant of the method according to the invention provides a method based on the Coriolis principle for measuring the mass flow rate of fluids one of which flows at least temporarily through a first and a second measuring tube which are designed to be inserted into a pipe, which extend parallel to each other, a respective axis of which lies in a first plane, which have the same inside and outside diameters as well as the same wall thickness, and which are made of the same material, said method comprising the steps of:

clamping a first clamping body and a second clamping body having identical masses onto the first and second measuring tubes at a predetermined distance L from each other to define measuring lengths forming respective sections of the measuring tubes;

attaching at least one vibration exciter in the middle of each of the tube sections which excites the tube sections into oppositely directed vibrations of a third mode in the first plane at a frequency f which, if the tube sections are filled with one of the fluids, lies between approximately 500 Hz and 1000 Hz, said distance L being calculated by the following formula:

$$L=5.5 \cdot 2^{1/2} \cdot (2\pi f)^{-1/2} \cdot \{E(r_a^4-r_i^4)/(d_M+d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

fixing a first displacement or velocity sensor and a second displacement or velocity sensor between the tube sections at positions where, if the tube sections are excited in the third mode of vibration, a deflection of the tube sections caused by a disturbance originating from the pipe has a first zero and a second zero, respectively;

determining a phase difference or time difference between a first sensor signal provided by the first sensor and a second sensor signal provided by the second sensor; and deriving therefrom a signal proportional to the mass flow rate.

In respective first embodiments of the first and second variants of the method according to the invention, the first and second isolating bodies are so designed and arranged that the first isolating body consists of a first fixing piece, a first intermediate piece, a second intermediate piece, a first squared end piece, and a second squared end piece, that the second isolating body consists of a second fixing piece, a third intermediate piece, a fourth intermediate piece, a third squared end piece, and a fourth squared end piece, that a respective longitudinal axis of the four squared end pieces is parallel to the axis of the pipe section or the measuring tube, that the longitudinal axes of the first and second squared end pieces and the axis of the pipe section or the measuring tube lie in a second plane perpendicular to the first plane, that the longitudinal axes of the third and fourth squared end pieces and the axis of the pipe section or the measuring tube lie in the second plane, that the respective intermediate piece has a substantially smaller cross section than the respective squared end piece, and that the respective fixing piece is fixed to the pipe or the measuring tube.

In respective second embodiments of the first and second variants of the method according to the invention and in a further development of the first embodiment, a straight measuring tube is used.

In respective third embodiments of the first and second variants of the method and in another further development of the first embodiment, a measuring tube with a tube section bent in the first plane is used.

In respective fourth embodiments of the first and second variants of the method and in still another further development of the first embodiment, a measuring tube with a tube section bent in the second plane is used.

In respective fifth embodiments of the first and second variants of the method, which are also usable with the above-mentioned further developments, the vibration exciter is an electrodynamic exciter with a seismic mass.

A first variant of the Coriolis mass flow sensor according to the invention is formed by means of a preexisting, permanently installed pipe through which a fluid flows at least temporarily, and is characterized in that in order to define a measuring length forming a pipe section, a first isolating body and a second isolating body with identical masses are fixed to the outside of the pipe at a predetermined distance L from each other, each of said masses being at least five times as great as the mass of the pipe section, that in the middle of the pipe section, a vibration exciter is fixed which excites the pipe section in a third mode of vibration, in a first plane containing an axis of the pipe section, at a frequency f which, if the pipe section is filled with one of the fluids, lies between approximately 500 Hz and 1000 Hz, said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

each of said isolating bodies having a first axis lying in the first plane, a second axis identical with the axis of the pipe section, and a third axis perpendicular to the first and second axes, and having an areal moment of inertia about the first axis which is at least one order of magnitude less than its areal moment of inertia about the third axis, and that a first and a second acceleration sensor are fixed to the pipe section at positions where, if the pipe section is excited in the third mode of vibration, a deflection of the pipe section caused by a disturbance originating from the pipe has a first zero and a second zero, respectively.

A second variant of the Coriolis mass flow sensor according to the invention is formed by means of a preexisting, permanently installed pipe through which a fluid flows at least temporarily, and is characterized in that in order to define a measuring length forming a pipe section, a first isolating body and a second isolating body with identical masses are fixed to the outside of the pipe at a predetermined distance L from each other, each of said identical masses being at least five times as great as the mass of the tube section, that in the middle of the pipe section, a vibration exciter is fixed which excites the pipe section in a third mode of vibration, in a first plane containing an axis of the tube section, at a frequency f which, if the pipe section is filled with one of the fluids, lies between approximately 500 Hz and 1000 Hz, said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

each of said isolating bodies having a first axis lying in the first plane, a second axis perpendicular thereto and identical with the axis of the pipe section, and a third axis perpendicular to the first and second axes, and having an areal moment of inertia about the first axis which is at least one order of magnitude less than its areal moment of inertia about the third axis, that the first isolating body has an inlet-side first sensor support fixed thereto, a longitudinal axis of which is parallel to the axis of the pipe section, that the second isolating body has an outlet-side second sensor support fixed thereto, a longitudinal axis of which is parallel to the axis of the pipe section, and that a first displacement or velocity sensor and a second displacement or velocity sensor are fixed to the first and second sensor supports, respectively, at positions where, if the pipe section is excited in the third mode of vibration, a deflection of the pipe section caused by a disturbance originating from the pipe has a first zero and a second zero, respectively.

A third variant of the Coriolis mass flow sensor according to the invention is designed to be inserted into a pipe through which a fluid flows at least temporarily, and comprises a single measuring tube to the outside of which a first and a second isolating body having identical masses are fixed at a predetermined distance L from each other to define a measuring length forming a tube section, each of said identical masses being at least five times as great as the mass of the tube section, to which a vibration exciter is fixed in the middle of the tube section which excites the tube section in a third mode of vibration, in a first plane containing an axis of the tube section, at a frequency f which, if the tube section is filled with one of the fluids, lies between approximately 500 Hz and 1000 Hz, said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4},$$

where
$r_a$ is the outside diameter of the pipe or tube section,
$r_i$ is the inside diameter of the pipe or tube section,
E is the modulus of elasticity of the material of the pipe or tube section,
$d_M$ is the product of the density of the material of the pipe or tube section and the cross-sectional area of the wall of the pipe or tube section, and
$d_F$ is the product of the mean density of the fluids and the cross-sectional area of the lumen of the pipe or tube section;

each of said isolating bodies
  having a first axis lying in the first plane, a second axis perpendicular thereto and identical with the axis of the tube section, and a third axis perpendicular to the first and second axes, and
  having an areal moment of inertia about the first axis which is at least one order of magnitude less than its areal moment of inertia about the third axis, with a first and a second acceleration sensor being fixed to the tube sections at positions where, if the tube section is excited in the third mode of vibration, a deflection of the tube section caused by a disturbance originating from the pipe as a first zero and a second zero, respectively.

A fourth variant of the Coriolis mass flow sensor according to the invention is designed to be inserted into a pipe through which a fluid flows at least temporarily, and comprises a single measuring tube to the outside of which a first and a second isolating body having identical masses are fixed at a predetermined distance L from each other to define a measuring length forming a tube section, each of said identical masses being at least five times as great as the mass of the tube section, to which a vibration exciter is fixed in the middle of the tube section which excites the tube section in a third mode of vibration, in a first plane containing an axis of the tube section, at a frequency f which, if the tube section is filled with one of the fluids, lies between approximately 500 Hz and 1000 Hz, said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where
$r_a$ is the outside diameter of the pipe or tube section,
$r_i$ is the inside diameter of the pipe or tube section,
E is the modulus of elasticity of the material of the pipe or tube section,
$d_M$ is the product of the density of the material of the pipe or tube section and the cross-sectional area of the wall of the pipe or tube section, the wall of the pipe or tube section, and
$d_F$ is the product of the mean density of the fluids and the cross-sectional area of the lumen of the pipe or tube section;

each of said isolating bodies
  having a first axis lying in the first plane, an axis perpendicular thereto and identical with the axis of the tube section, and a third axis perpendicular to the first and second axes, and
  having an areal moment of inertia about the first axis which is at least one order of magnitude less than its areal moment of inertia about the third axis, the first isolating body having an inlet-side first sensor support fixed thereto,
  a longitudinal axis of which is parallel to the axis of the measuring tube, the second isolating body having an outlet-side second sensor support fixed thereto,
  a longitudinal axis of which is parallel to the axis of the measuring tube, and a first displacement or velocity sensor and a second displacement or velocity sensor being fixed to the first and second sensor supports, respectively, at positions where, if the tube section is excited in the third mode of vibration, a deflection of the first and second sensor supports caused by a disturbance originating from the pipe has a first zero and a second zero, respectively.

In respective first embodiments of the first, second, third, and fourth variants of the Coriolis mass flow sensor according to the invention,
  the isolating bodies are so designed and arranged
    that the first isolating body consists of
      a first fixing piece,
      a first intermediate piece,
      a second intermediate piece,I
      a first squared end piece, and
      a second squared end piece,
    that the second isolating body consists of
      a second fixing piece,
      a third intermediate piece,
      a fourth intermediate piece,
      a third squared end piece, and
      a fourth squared end piece,
    that a respective longitudinal axis of the four squared end pieces is parallel to the axis of the pipe or tube section,
    that the longitudinal axes of the first and second squared end pieces and the axis of the pipe or tube section lie in a second plane perpendicular to the first plane,
    that the longitudinal axes of the third and fourth squared end pieces and the axis of the pipe or tube section lie in the second plane,
    that the respective intermediate piece has a substantially smaller cross section than the respective squared end piece, and
    that the respective fixing piece is fixed to the pipe or the measuring tube.

In respective second embodiments of the four variants of the Coriolis mass flow sensor according to the invention and in a further development of the first embodiment, the measuring tube is straight.

In respective third embodiments of the four variants of the Coriolis mass flow sensor according to the invention and in another further development of the first embodiment, the measuring tube is bent between the isolating bodies in the first plane.

In respective fourth embodiments of the four variants of the Coriolis mass flow sensor according to the invention and in still another further development of the first embodiment, the measuring tube is bent between the isolating bodies in the second plane.

In respective fifth embodiments of the four variants of the Coriolis mass flow sensor according to the invention and in a last development of the first embodiment, the vibration exciter is an electrodynamic exciter with a seismic mass.

A fifth variant of the Coriolis mass flow sensor according to the invention is designed to be inserted into a pipe through which a fluid flows at least temporarily, and comprises a first and a second measuring tube which extend parallel to each other, a respective axis of which lies in a first plane, which have the same inside and outside diameters as well as the same wall thickness, which are made of the same material, onto each of which a first and a second clamping body having identical masses are clamped at a predetermined distance L from each other to define measuring lengths forming respective sections of the measuring tubes, and to which at least one vibration exciter is attached in the middle of the respective tube section which excites the tube sections into oppositely directed vibrations of a third mode in the first plane at a frequency f which, if the tube sections are filled with one of the fluids, lies between approximately 500 Hz and 1000 Hz, said distance L being calculated by the following formula:

$$L=5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

with a first displacement or velocity sensor and a second displacement or velocity sensor being fixed to the tube sections at positions where, if the tube sections are excited in the third mode of vibration, a deflection of the tube sections caused by a disturbance originating from the pipe has a first zero and a second zero, respectively.

The fundamental idea of the invention is to define on the pipe or on the measuring tube or tubes, by means of the two isolating bodies or the two clamping bodies, a pipe or tube section or pipe or tube sections which can be set virtually exclusively into vibrations necessary for the Coriolis principle of measurement, and to which the vibrations are thus limited. The isolating or clamping bodies are mechanically interconnected exclusively via the pipe or tube section.

An essential advantage of the invention is that the pipe section to be set into vibration can be freely selected in terms of its spatial location and its length between two fixing points predetermined by the installation of the pipe.

Another advantage of the invention is that, because of the large masses chosen in accordance with the invention for the isolating or clamping bodies, virtually no vibrations will occur outside the pipe or tube sections(s), and that, because of the locations chosen in accordance with the invention for the sensing elements, measurement accuracy is virtually unaffected by vibrations of the pipe.

A further advantage of the invention is that the application of the features of the solution found for clamp-on mass flow-meters to installation mass flow sensors makes it possible to manufacture the latter with simpler means; for example, the isolating or clamping bodies only need to be clamped onto the measuring tube or tubes, for example by means of screws.

BRIEF DESCRIPTION OF THE DRAWINGS

The invention will become more apparent from the following description of embodiments when taken in conjunction with the accompanying drawings. Like parts are designated by like reference characters throughout the figures but are shown in subsequent figures only where it appears appropriate. In the drawings:

FIG. 7 shows, as a third embodiment, essential parts of the second variant of the Coriolis mass flow sensor according to the invention or of the fourth variant of the Coriolis mass flow sensor according to the invention, comprising a single straight measuring tube;

FIG. 8 is a partially sectioned top view of a detail of FIG. 7;

FIG. 9 shows, as a fourth embodiment, a perspective view of essential parts of the fourth variant of an installation Coriolis mass flow sensor according to the invention, comprising a single tube section bent perpendicular to the plane of vibration;

FIG. 10 shows, as a fifth embodiment, a perspective view of essential parts of the fourth variant of the installation Coriolis mass flow sensor according to the invention, comprising a tube section bent perpendicular to the plane of vibration;

FIG. 11 shows, as a sixth embodiment, a perspective view of essential parts of the fifth variant of the Coriolis mass flow sensor according to the invention, comprising two parallel straight measuring tubes;

FIG. 12 shows, as a seventh embodiment, a perspective view of essential parts of an installation Coriolis mass flow sensor comprising two parallel bent measuring tubes;

DETAILED DESCRIPTION OF PREFERRED EMBODIMENTS

Figure 1:
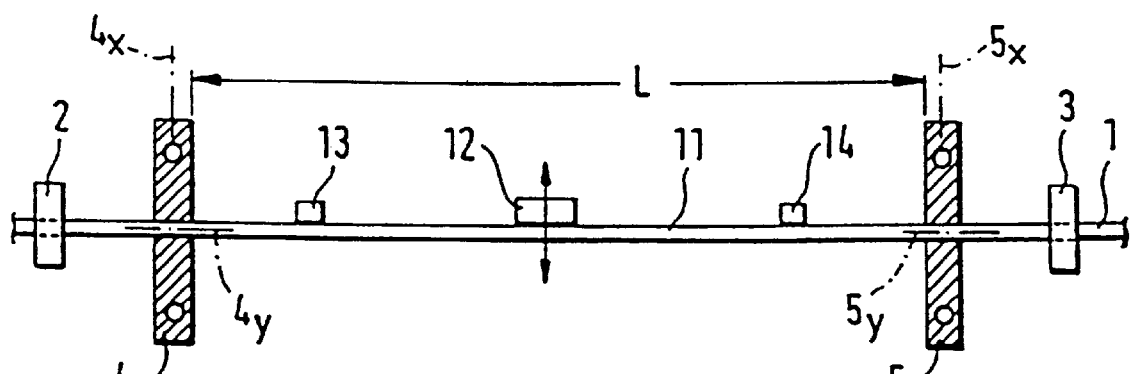
FIG. 1 shows, as a first embodiment, a schematic, partially sectioned longitudinal view of the first variant of the Coriolis mass flow sensor according to the invention.
Figure 2:
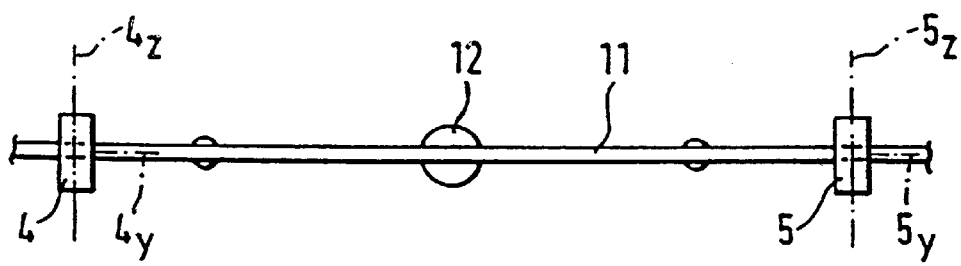
FIG. 2 is a top view of the mass flow sensor of FIG. 1.
Figure 3:
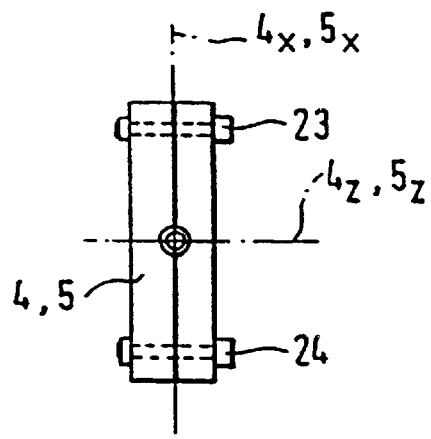
FIG. 3 is an end view of the mass flow sensor of FIG. 1.

FIG. 1 shows, as a first embodiment, a schematic, partially sectioned longitudinal view of the first variant of the Coriolis mass flow sensor according to the invention, as is formed by use of the first variant of the method according to the invention. FIGS. 2 and 3 are top and end views, respectively, of the mass flow sensor of FIG. 1.

The first variant of the Coriolis mass flow sensor serves to measure the mass flow rate of fluids, one of which flows at least temporarily through a pre-existing, permanently installed pipe 1. This variant is thus a clamp-on Coriolis mass flow sensor.

The permanent installation of the pipe 1 is illustrated in FIG. 1 by two fixing devices 2, 3, such as two pipe clamps or the like, by which the pipe 1 is fixed to the wall of a building or to a rack etc. The fixing devices 2, 3 may also be permanently fixed components of a pipe system, such as valves, pumps, manifolds, etc., in or to which the pipe 1 is fixed.

Figure 4:
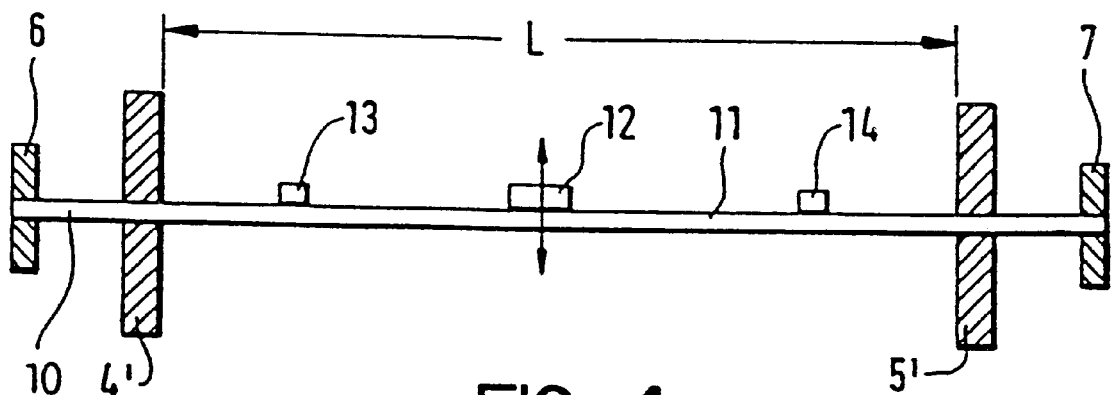
FIG. 4 shows, as a second embodiment, a schematic, partially sectioned longitudinal view of the third variant of the mass flow sensor according to the invention, comprising a single straight measuring tube.
Figure 5:
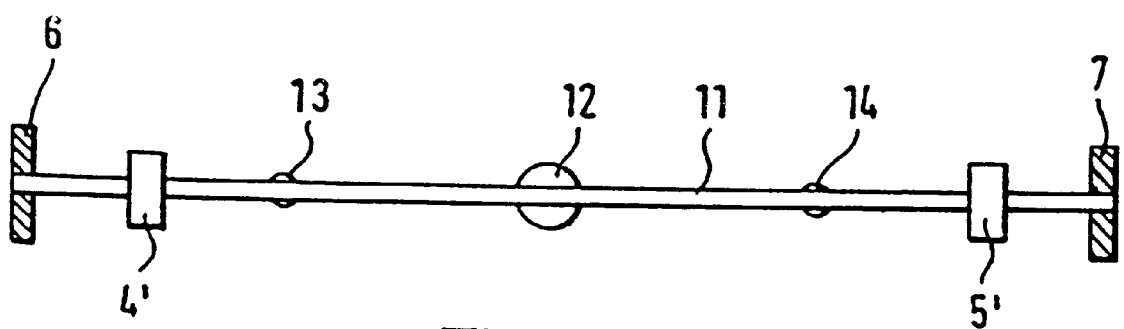
FIG. 5 is a top view of the mass flow sensor of FIG. 4.
Figure 6:
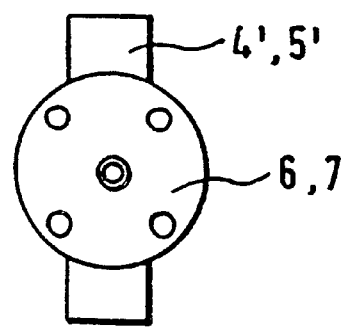
FIG. 6 is an end view of the mass flow sensor of FIG. 4.

FIG. 4 shows, as a second embodiment, a schematic, partially sectioned longitudinal view of the third variant of the Coriolis mass flow sensor according to the invention as created by use of the second variant of the method according to the invention, and FIGS. 5 and 6 are top and end views, respectively, of the mass flow sensor of FIG. 4.

This variant serves to measure the mass flow rate of fluids, one of which flows temporarily through a pipe (not shown) into which the third variant of the Coriolis mass flow sensor can be installed after its manufacture. This variant is thus an installation Coriolis mass flow sensor. The sensor is installed, for example, by means of a first and a second flange 6, 7, in which the respective ends of a measuring tube 10 are fixed.

Along the pipe 1 or the measuring tube 10, a pipe or tube section 11 is defined as a measuring length L. This length L is determined by the formula $$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe or tube section, $r_i$ is the inside diameter of the pipe or tube section, E is the modulus of elasticity of the material of the pipe or tube section, $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section.

A first isolating body 4, 4' and a second isolating body 5, 5', each of which has the same mass as the other, are fixed to the external surface of the pipe 1 or the measuring tube 10 at a predetermined distance from each other which is equal to the length L. The mass of each of the isolating bodies 4, 5 or 4', 5' is at least five times as large as the mass of the pipe or tube section 11.

It should be noted that there is no mechanical connection between the isolating bodies 4, 5 or 4', 5' other than that provided by the pipe or tube section 11 itself. In this respect, the isolating bodies 4', 5' of the second variant of the Coriolis mass flow sensor according to the invention differ from prior-art arrangements in which the vibrating pipe or tube section 11 is fixed in an inner support tube or in a support frame or on a plate, cf. EP-A-803 713 and U.S. Pat. No. 5,705,754.

In FIG. 1, it is indicated by bores in the isolating bodies 4, 5 that these bodies advantageously consist of two parts, so that they can be clamped onto the pipe 1 by means of screws 23, 24, see FIG. 3. By contrast, in the third variant of the Coriolis mass flow sensor according to the invention, shown in FIGS. 4 to 6, the isolating bodies 4', 5' can be of one-piece construction, so that they can be fixed to the tube section 11 by, e.g., welding, soldering, or brazing.

Approximately, preferably exactly, in the middle of the pipe or tube section 11, a vibration exciter 12 is attached which excites the pipe or tube section 11 in a third mode of vibration in a plane containing an axis of the pipe or tube section 11; this is indicated by a double-headed arrow. In FIGS. 1 and 4, this plane is the plane of the paper.

The third mode is that vibration of the pipe or tube section 11 where only two vibration nodes and three antinodes occur simultaneously between the isolating bodies 4, 5 or 4', 5'. The third mode is comparable to the second overtone of a vibrating string.

By contrast, the second mode described in and used by the above-mentioned U.S. Pat. No. 5,321,991 is that vibration of the pipe or tube section where only a single node and two antinodes occur simultaneously between the clamping points. The second mode is comparable to the first overtone of a vibrating string.

In the present invention, the third mode has approximately five times the frequency of the first mode, which is the fundamental mode. The fundamental mode has a single antinode and a first node at the first isolating body as well as a second node at the second isolating body.

Each of the isolating bodies 4, 5 or 4', 5' has three space axes, which are shown only in FIGS. 1 to 3 for simplicity. A first axis $4_x$, $5_x$ lies in the plane of vibration and is parallel to the direction of deflection indicated by the above-mentioned double-headed arrow.

A second axis $_4y$, $_5y$ which is perpendicular to the first axis, is identical with the axis of the pipe section 11. A third axis is perpendicular to the first axis and to the second axis i.e., to the axis of the pipe section 11.

The axes $_4x$, $_4y$, $_5x$, $_5y$ can be seen in FIG. 1 and lie in the plane of the paper. The axes $4_y$, $4_z$, $5_y$, $5_z$ can be seen in FIG. 2 and lie in the plane of the paper. The axes $4_x$, $5_x$, $4_z$, $5_z$ can be seen in FIG. 3 and lie in the plane of the paper, where the axes $4_x$, $5_x$ and the axes $4_z$, $5_z$ lie over each other.

The geometrical shape and the size of each isolating body 4, 5 or 4', 5' are so chosen that its areal moment of inertia about its first axis $4_x$, $5_x$ is at least one order of magnitude less than its areal moment of inertia about its third axis $4_z$, $5_z$. Therefore, in the embodiments shown in FIGS. 1 and 2, the isolating bodies 4, 5 or 4', 5' are narrow and high rectangular parallelepipeds.

A first sensing element 13 and a second sensing element 14 are fixed to the pipe section 11 in the plane of vibration at positions where, with the above-explained excitation in the third mode of vibration, a deflection of the pipe section 11 caused by a disturbance originating from the pipe 1 has a first zero and a second zero, respectively.

The locations of these zeros on the pipe or tube section 11 can be easily determined empirically: If the vibration exciter 12 is fixed in the middle of the pipe or tube section 11, the zeros are located at the same distance from the isolating bodies 4 and 5, respectively; in the case of a homogeneous measuring tube, this distance is equal to 0.21 of the length of the tube section. The respective locations of the zeros are not correlated with the respective locations of the nodes of the third mode, i.e., these locations are independent of each other.

The sensing elements 13, 14 in FIGS. 1 and 4 are acceleration sensors, which only need to be attached to the pipe or tube section 11. This use of acceleration sensors, however, is not mandatory, cf. below the explanations of FIGS. 7 to 16, where displacement or velocity sensors are employed.

A displacement sensor provides a sinusoidal signal whose phase shift with respect to the sinusoidal motion of the pipe or tube section 11 is zero.

A velocity sensor provides a sinusoidal signal whose phase shift with respect to the sinusoidal motion of the pipe or tube section 11 caused by the vibration exciter 12 is 90°.

An acceleration sensor provides a sinusoidal signal whose phase shift with respect to the motion of the pipe or tube section 11 caused by the vibration exciter 12 is 180°.

Since these sensor signals are sinusoidal signals regardless of whether they are provided by an acceleration, velocity, or displacement sensor, a signal representative of the mass flow rate with very high accuracy can be derived from a flow-induced phase difference between the sinusoidal signals of the sensing elements 13, 14 or from the time distance between these sinusoidal signals, i.e., from a time difference, using conventional evaluation electronics.

A disturbance originating from the pipe 1 will cause the isolating bodies 4 and 5 to be twisted in the plane of vibration about the third axes $4_z$, $5_z$, respectively. The pipe section 11 is bent by this twist such that the aforementioned first and second zeros occur; the locations of these two zeros on the pipe section 11 are independent of the degree of twisting of the isolating bodies 4, 5.

Therefore, if, according to the invention, the sensing elements 13, 14 are mounted at these zeros, they will not pick up any disturbance-induced signal components in the plane of vibration and will provide undisturbed measurement signals. Since the sensing elements 13, 14 respond practically only to motions in the plane of vibration, disturbance-induced twists in planes other than the planes of vibration will have no effect on the measurement signals.

The electronic generation of a signal representative of the mass flow rate by evaluation of the aforementioned phase difference can be performed, for example, with a circuit as is described in U.S. Pat. No. 5,648,616. Other circuit arrangements are also suitable, such as the circuits disclosed in U.S. Pat. No. 4,914,956.

FIG. 7 shows, as a third embodiment, a perspective view of essential parts of a clamp-on Coriolis mass flow sensor according to a second variant of the invention or of an installation Coriolis mass flow sensor with a single straight tube section according to a fourth variant of the invention. The second and fourth variants result from the use of the second variant of the method according to the invention.

In the embodiment of FIG. 7, the sensing elements are a first displacement or velocity sensor 13' and a second displacement or velocity sensor 14'. Electrodynamic sensing elements are particularly suited for this embodiment. Since displacement or velocity sensors require a fixed point in space relative to which a part of the sensor is movable, the isolating body 4' has an inlet-side first sensor support 15 fixed to it, a longitudinal axis of which is parallel to the axis of the pipe tube section 11. In like manner, an outlet-side second sensor support 16, a longitudinal axis of which is parallel to the axis of the tube section 11, is fixed to the isolating body 5'.

The parts of the sensors 13' and 14' to be fixed to the tube section 11 are attached at the above-mentioned zeros of the disturbance-induced deflection. The other parts of the sensors 13' and 14' are fixed to the sensor supports 15 and 16, respectively. The dimensions of the latter, particularly their length and/or cross section, are chosen so that, if the pipe section 11 is excited in the third mode of vibration, a deflection of the sensor supports 15 and 16 caused by a disturbance originating from the pipe 1 has a first and a second zero at the mounting points of the sensors 13' and 14', respectively. These dimensions can be easily determined by experiments.

In FIG. 7, the isolating bodies 4', 5' have a preferred three-dimensional shape. The isolating body 4' consists of a first fixing piece 40, a first intermediate piece 41, a second fixing piece 42, a first squared end piece 43, and a second squared end piece 44. The second intermediate piece 42 is almost completely covered in FIG. 7 by the fixing piece 40, cf. the arrow.

The isolating body 5' consists of a second fixing piece 50, a third fixing piece 51, a fourth intermediate piece 52, a third squared end piece 53, and a fourth squared end piece 54. Here, the intermediate piece corresponding to the piece 42, i.e., the intermediate piece 52, is clearly visible.

A respective longitudinal axis of the four squared end pieces 43, 44, 53, 54 is parallel to the axis of the pipe section 11. The longitudinal axes of the squared end pieces 43, 44 and the axis of the tube section 11 lie in a second plane, which is perpendicular to the plane of vibration of the tube section (the plane of vibration is the above-defined first plane). The longitudinal axes of the squared end piece 53, 54 and the axis of the tube section 11 lie in the second plane.

The intermediate pieces 41, 42, 51, 52 have a substantially smaller cross section than the associated squared end pieces 43, 44, 53, 54. The fixing pieces 40, 50 are mounted on the pipe 1 or the measuring tube 10. To this end, the fixing pieces are preferably designed to be clamped onto the pipe or the measuring tube by tightening associated screws 20, cf. FIGS. 15 and 16.

Because of the intermediate pieces, the fixing pieces do not merge smoothly into the end pieces, but between the respective fixing piece and the respective end piece, a groove is provided on the top and bottom sides. These grooves prevent the occurrence of vibrations in planes other than the plane of vibration, i.e., they ensure that the pipe or tube section vibrates virtually exclusively in the plane of vibration.

FIG. 8 shows, in a top view and partly in section, a detail of FIG. 7, namely schematically the shape of an electrodynamic sensing element 13" with the above-mentioned two functional parts. The part fixed to the sensor support 15 is a coil 131, into which a permanent magnet 152 attached to the tube section 11 or the measuring tube penetrates more or less deep because of the vibration-induced movement of the pipe or tube, thus inducing a voltage in the coil.

The two sensors 13', 14' are advantageously identical in design and construction. Therefore, if the sensor 13' is an electrodynamic sensor, the sensor 14' will also be an electrodynamic sensor.

FIG. 9 is a perspective view of essential parts of a fourth embodiment of the Coriolis mass flow sensor according to the invention, an installation mass flow sensor with a single tube section 11' bent in the plane of vibration according to the fourth variant of the invention.

In FIG. 9, the plane of vibration is the plane containing the axis of the measuring tube 10', the longitudinal axes of the sensor supports 15, 16, and the axis of the tube section 11'; the latter axis is also bent but follows the tube bend and lies in the plane of vibration; the vibrations caused by the vibration exciter 12' are indicated by a double-headed arrow.

FIG. 10 is a perspective view of essential parts of a fifth embodiment of the Coriolis mass flow sensor according to the invention, an installation mass flow sensor with a single tube section 11" bent perpendicular to the plane of vibration according to the fourth variant of the invention.

Here, like in FIG. 9, a first plane is defined by the axis of the measuring tube 10" and the longitudinal axes of the sensor supports 15, 16. Unlike FIG. 9, the tube section 11" is bent not in this plane, but in a second plane which is perpendicular thereto and also contains the longitudinal axes of the squared end pieces 43, 44, 53, 54. The axis of the tube section is thus bent in this case, too.

To excite the tube section 11" into vibration from a position of rest, the vibration exciter 12" exerts a force parallel to the first plane, cf. the double-headed arrow. Hence, the bent axis of the tube section 1", and thus the second plane just mentioned, vibrate about an axis of rotation that is identical with the axis of the measuring tube 10".

In installation Coriolis mass flow sensors with a single measuring tube, the latter will commonly be made of a suitable metal, particularly of titanium, zirconium, or high-grade steel.

FIG. 11 shows, as a sixth embodiment, a perspective view of essential parts of an installation Coriolis mass flow sensor with two parallel straight measuring tubes 101, 102 according to a fifth variant of the invention. Here, tube sections 111, 112 extend not between isolating bodies, but between clamping bodies 4", 5".

The respective axes of the measuring tubes 101, 102 again lie in the first plane, which is the plane of vibration and contains the axis of symmetry common to the two measuring tubes. The measuring tubes 101, 102 have the same inside and outside diameters as well as the same wall thickness and are made of the same material, particularly of titanium, zirconium, or high-grade steel.

The clamping bodies 4", 5", which have identical masses, define the length of the tube sections 111, 112 via the distance L according to the above formula, and are clamped onto the measuring tubes 101, 102, for example by means of screws, which are not shown in order to simplify the illustration.

Fixed in the middle of the tube sections 111, 112 is a vibration exciter 12' which excites the tube sections into opposite vibrations of a third mode in the first plane at a frequency f which, if the tube sections are filled with one of the fluids, lies between approximately 500 Hz and 1000 Hz.

The vibration exciter 12' will generally be an electrodynamic exciter consisting of two parts movable relative to each other. These may be disposed, for example, between the two tube sections 111, 112, so that they move either toward each other or away from each other. In that case, only a single exciter is necessary.

It is also possible to associate a separate exciter with each tube section in such a manner that in the plane of vibration, one of the tube sections lies opposite the other tube section at the respective outer side remote from the other tube section. The respective unmovable part of the exciters is then fixed to a case (not shown in FIG. 11); such cases will be described below with reference to FIGS. 13 and 14.

A first displacement or velocity sensor 131' and a second displacement or velocity sensor 141' are fixed to the tube sections 111 and 112 at respective positions where, when the tube sections are excited in the third mode of vibration, a deflection of the tube sections caused by a disturbance originating from the pipe has a first and a second zero, respectively.

Since each of the sensors 131', 141' again consists of two parts movable relative to each other, these parts may be disposed between the two tube sections 111, 112, for example, so that they will move either toward each other or away from each other.

It is also possible to mount a separate sensor on each of the tube sections at each of the above-defined positions, so that a total of four sensors are present. The two sensors at each of those positions are then fixed to the tube sections in such a way as to lie opposite each other in the plane of vibration at the respective outer side remote from the other tube section. The respective unmovable parts of the sensors are then fixed to the aforementioned case.

FIG. 12 shows, as a seventh embodiment, essential parts of an installation Coriolis mass flow sensor with two parallel bent measuring tubes 101', 102' in a perspective view. Here, too, tube sections 111', 112' are located not between isolating bodies, but between clamping bodies 4*, 5*.

The bent axis of the measuring tube 101' lies in one plane, and the bent axis of the measuring 102' lies in a plane parallel to that plane. Between these two planes, there is a plane of symmetry. The measuring tubes 101', 102' have the same inside and outside diameters and the same wall thickness, and are made of the same material, particularly of titanium, zirconium, or high-grade steel.

The clamping bodies 4*, 5* which have identical masses, again define the length of the tube sections 111', 112' via the distance L according to the above formula, and are clamped onto the measuring tubes 101', 102' from outside, which may be done by means of screws (not shown in order to simplify the illustration).

Fixed in the middle of the tube sections 111', 112' is a vibration exciter 12" which excites the tube sections into opposite vibrations of a third mode at a frequency f which, when the tube sections are filled with one of the fluids, lies between approximately 500 Hz and 1000 Hz.

It should be emphasized that in this embodiment, no plane of vibration can be defined, since each of the tube sections 111', 112' performs a torsional vibration. The axis of rotation of the torsional vibration of the tube section 111' is a straight line which joins the piercing points of the axis of the tube section 111' through the facing surfaces of the clamping bodies 4*, 5* The axis of rotation of the torsional vibration of the tube section 112' is a straight line which joins the piercing points of the axis of the tube section 112' through the facing surfaces of the clamping bodies 4*, 5*.

Because of this spatial association between the tube sections 111', 112', the vibration exciter 12" exerts a force on the tube sections 111', 112' which is directed perpendicular to the above-mentioned plane of symmetry.

In this embodiment, too, the vibration exciter 12" is preferably an electrodynamic exciter consisting of two parts movable relative to each other. These may be disposed between the two tube sections 111', 112', for example, so that they will move either toward each other or away from each other. In that case, only a single exciter is necessary.

It is also possible to associate a separate exciter with each tube section in such a manner that in the plane of vibration, one tube section lies opposite the other tube section at the respective outer side remote from the other tube section. The respective unmovable part of the exciters is then fixed to a case (not shown as in FIG. 11), see FIGS. 13 and 14.

A first displacement or velocity sensor 131" and a second displacement or velocity sensor 141" are fixed to the tube sections 111', 112' at respective positions where, when the tube sections are excited in the third mode of vibration, a deflection of the tube sections caused by a disturbance originating from the pipe has a first and a second zero, respectively.

As the sensors 131", 141" again consist of two parts movable relative to each other, the latter may be disposed between the two tube sections 111', 112', for example, so that they will move either toward each other or away from each other as a result of the vibrations.

It is also possible to mount a separate sensor on each of the tube sections at each of the above-defined positions, so that a total of four sensors are present. The two sensors at each of those positions are then fixed to the tube sections in such a way as to lie opposite each other in the plane of vibration at the respective outer side remote from the other tube section. The respective unmovable part of the sensors is fixed to the above-mentioned case.

Figure 13:
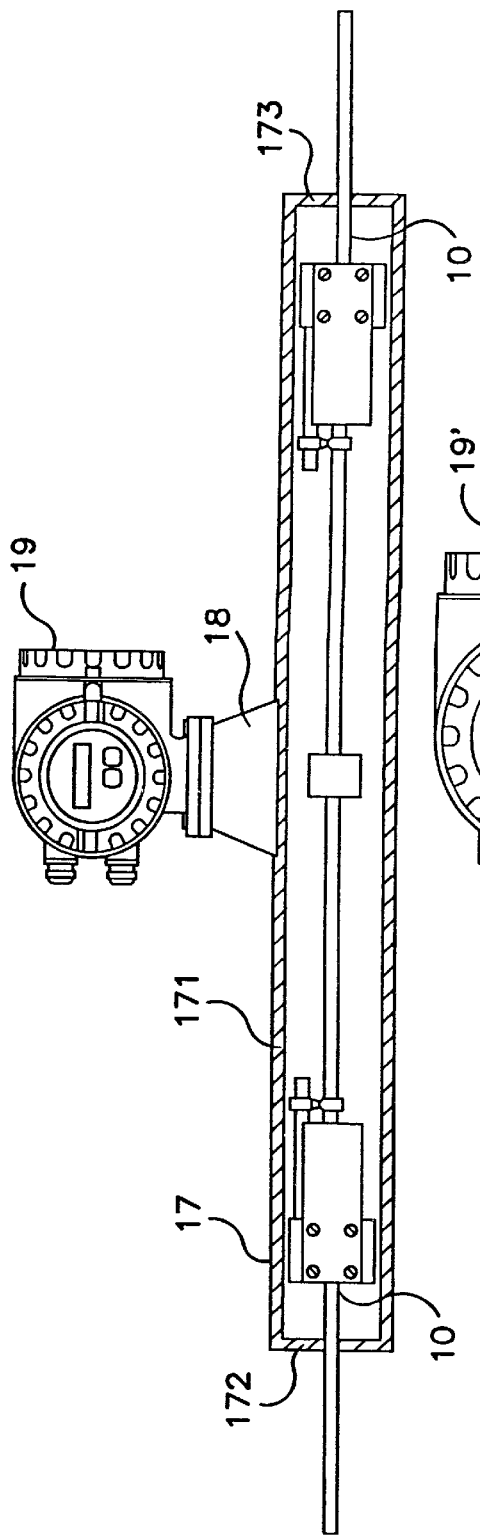
FIG. 13 is a schematic, partially sectioned longitudinal view of an encased installation Coriolis mass flow sensor corresponding to any one of the embodiments of FIGS. 7 to 10.

FIG. 13 is a schematic, partially sectioned longitudinal view of an installation Coriolis mass flow sensor according to any one of the embodiments of FIGS. 7 to 10 which is enclosed in a case 17.

The case 17 may have the form of a support tube 171 closed at its end by end plates 172 and 173, in which the measuring tube 10 is fixed. Outside the end plates 172, 173, the connection to the pipe is made in the usual manner. Since there are various types of connection suitable for this purpose, such as flanged, bolted, or clamped joints, the type of connection is not specified in FIG. 13.

Mounted on the case 17 via a connecting piece 18 is an electronics housing 19 containing conventional operating, drive, evaluation, and display electronics.

Figure 14:
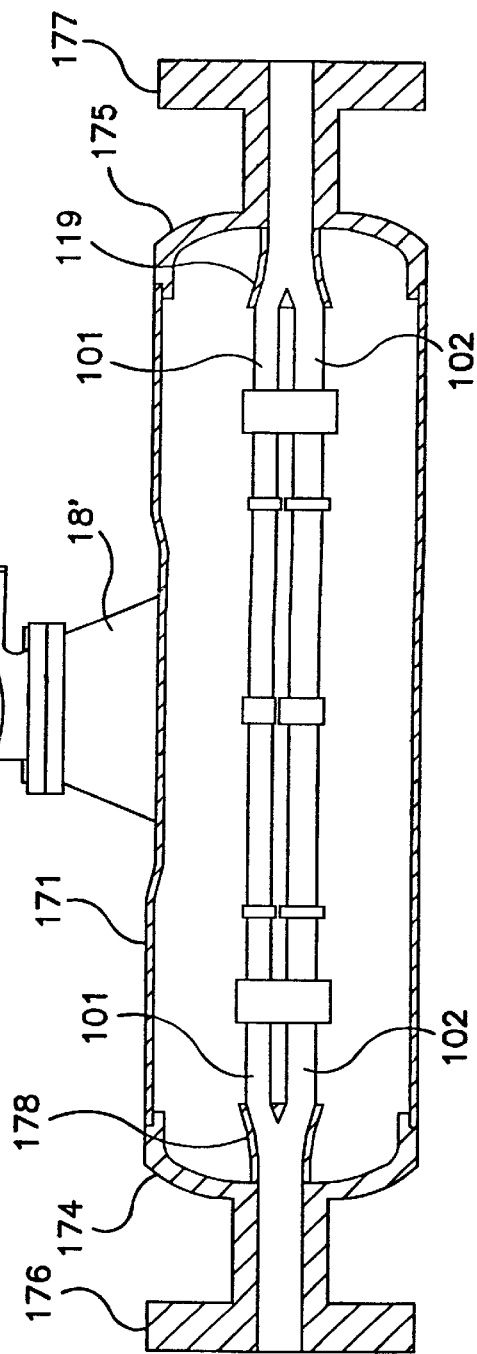
FIG. 14 is a schematic, partially sectioned longitudinal view of an encased installation Coriolis mass flow sensor corresponding to the embodiment of FIG. 11 or FIG. 12.

FIG. 14 is a schematic, partially sectioned longitudinal view of an installation Coriolis mass flow sensor according to the embodiment of FIG. 11 or 12 which is enclosed in a case 17'.

The case 17' has the form of a support tube 171' which is closed at its ends by end caps 174 and 175, respectively, each having a flange 176, 177 integrally formed thereon. The two measuring tubes 101, 102 are connected to the end caps 174 and 175, and thus to the flanges 176 and 177, via manifolds 178 and 179, respectively. By means of the flanges 176, 177, the mass flow sensor is connected to the pipe in the usual manner.

While the manifolds 178, 179 are shown in FIG. 13 as funnel-shaped devices, i.e., with a continuous transition from the two measuring tubes 101, 102 to the nominal diameter of the pipe, this design is not mandatory. It is also common practice to let the measuring tubes end flush at the pipe-side end, see U.S. Pat. No. 5,602,345.

Mounted on the case 17' via a connecting piece 18' is an electronics housing 19' containing conventional operating, drive, evaluation, and display electronics.

Figure 15:
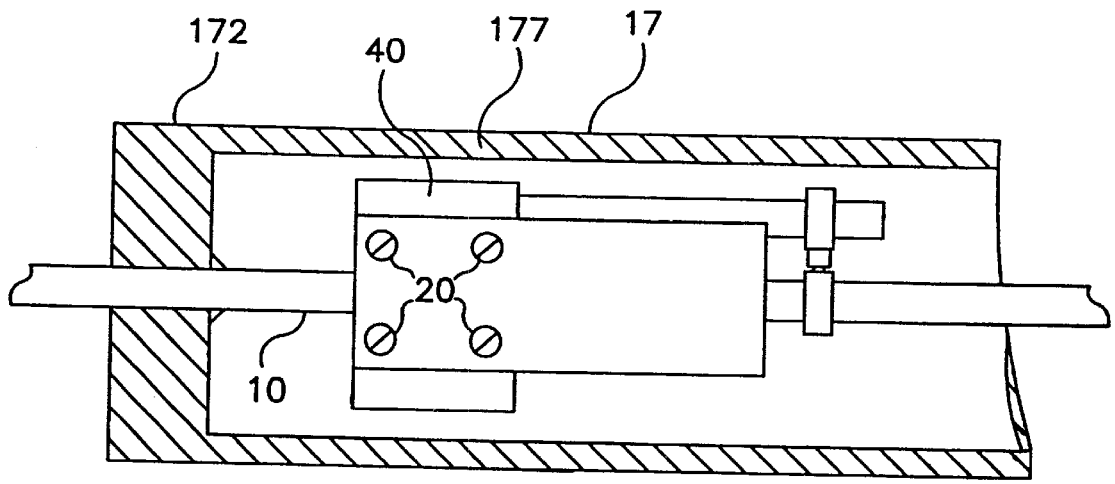
FIG. 15 shows a detail of any one of the embodiments of FIGS. 7 to 10 with the case rigidly fixed to the measuring tube.

FIG. 15 shows a detail of FIG. 13 in which the case is rigidly fixed to the measuring tube 10, as was briefly mentioned above. Four screws 20 can be seen which, as mentioned, serve to clamp the fixing piece 40 onto the measuring tube 10 from outside.

The rigid fixing of end plate 172 and measuring tube 10 is commonly achieved by soldering, brazing, or welding, and will generally be used if the measuring tube is made of zirconium or titanium, while the case 17 is made of high-grade steel, cf. the welds indicated in FIG. 15. The same applies for the end plate 173 of FIG. 13, which is not visible in FIG. 15. It is also possible to shrink the end plates 172, 173 onto the measuring tube 10.

The rigid fixing is possible with titanium and zirconium since thermally induced length changes of each of these two materials are small compared to high-grade steel. With a rigid fixing, a temperature difference of up to 200° C. can be permitted between a measuring tube of titanium or zirconium and a case of high-grade steel.

Figure 16:
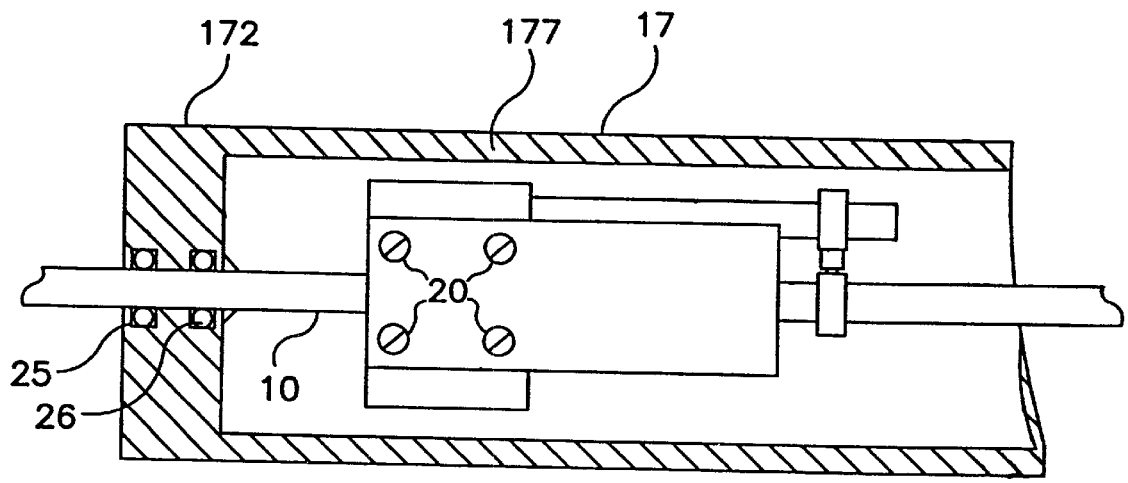
FIG. 16 shows another detail of any one of the embodiments of FIGS. 7 to 10 with the case movable in the direction of the measuring tube.

FIG. 16 shows another detail of FIG. 13 with the case 17 movable in the direction of the measuring tube 10. Here, both the measuring tube 10 and the case 17 are made of high-grade steel. As the thermal expansion coefficient of high-grade steel is about twice that of titanium or zirconium, and the mechanical strength of high-grade steel is only half that of titanium or zirconium, the permissible temperature difference for a rigid fixing of a measuring tube of high-grade steel to a case of high-grad steel would be reduced to about one quarter of the above value, i.e., to about 50° C. Such a flow sensor would be unmarketable.

It is therefore necessary to fix the measuring tube 10 so that it is free to move axially relative to the end plate 172. To this end, the embodiment of FIG. 16 includes two O rings 25, 26 which are fitted in the wall of the bore in the end plate 172, through which the measuring tube 10 extends. The same applies for the end plate 173 of FIG. 13, which is not visible in FIG. 16.

Figure 17:
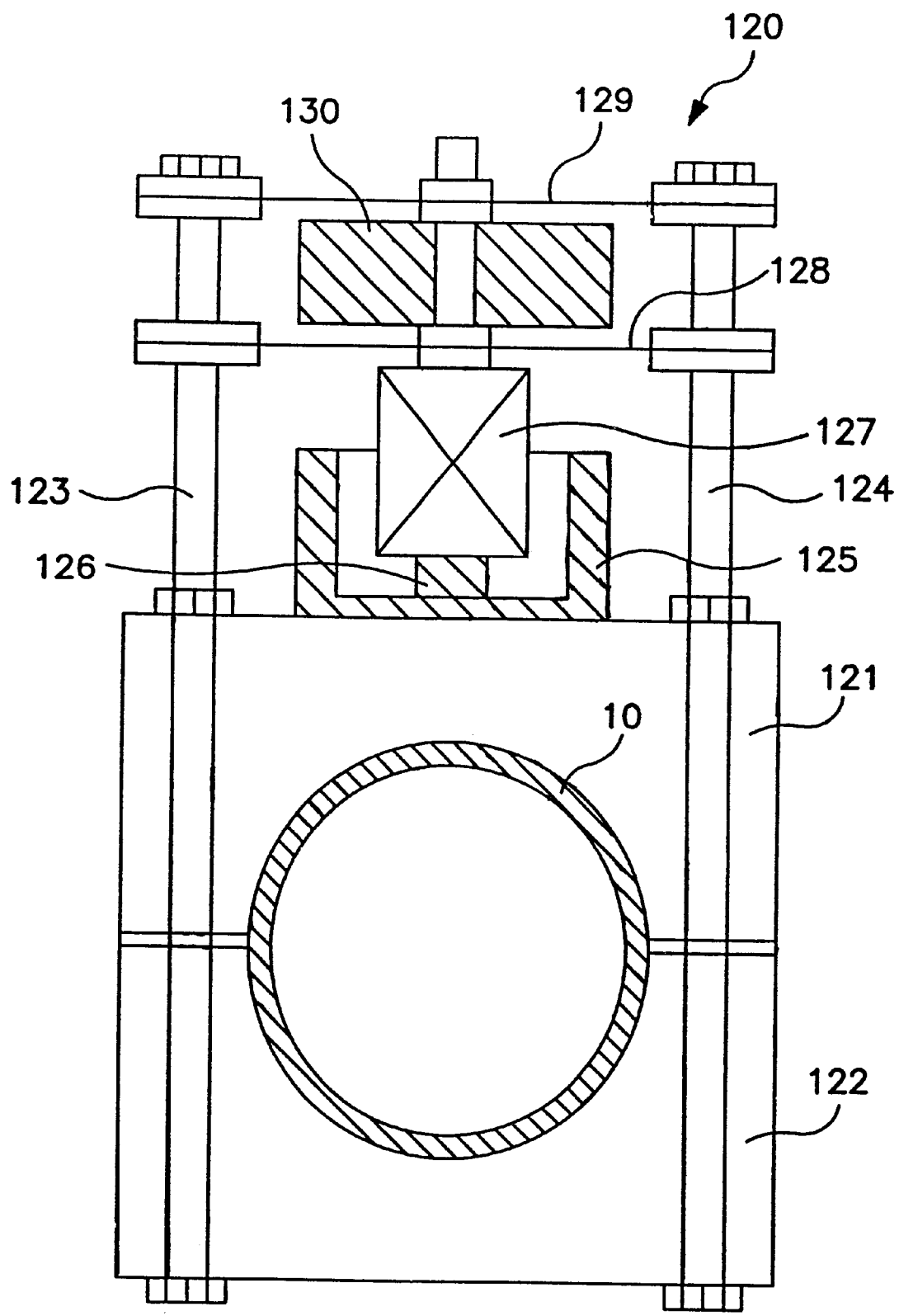
FIG. 17 shows, partly in section, the construction of an electrodynamic vibration exciter with a seismic mass.

FIG. 17 is an enlarged, partially sectioned view of an electrodynamic exciter 120 with a seismic mass 130 as is preferably used in the embodiments of FIGS. 1 to 10.

The exciter 120 comprises a first and a second clamping jaw 121, 122, by which it is clamped onto the measuring tube 10. This clamping is accomplished using bolts 123, 124 and associated nuts.

Attached to the side of the clamping jaw 121 remote from the measuring tube is a magnetic cup 125 with a central permanent magnet 126. The latter extends into a coil 127 fixed to one side of a first spring steel sheet 128. The seismic mass 130 is attached, on the one hand, to the other side of the spring steel sheet 128 and, on the other hand, to a second spring steel sheet 129.

The spring steel sheets 128, 129 are also fixed to the bolts 123, 124, so that the seismic mass 130 is clamped between, and capable of vibrating together with, the spring steel sheets 128, 129. If the coil 127 is supplied with alternating current, its motions relative to the magnetic cup 125 will be transmitted to the measuring tube 10, so that the latter will vibrate.

When selecting the resonance properties of the vibrating system comprising the seismic mass 130, the spring steel sheets 128, 129, and the coil 127, a choice must be made between a setting to above resonance and a setting to below resonance.

A "setting to below resonance" means that the exciter 120 has a mechanical resonance frequency less than one third of the frequency f of the respective tube section in the third mode of vibration. Such a dimensioning choice gives an optimum exciter efficiency, but the exciter is a source of low frequencies which may adversely affect the overall vibration response of the Coriolis flow sensor.

A "setting to above resonance" means that the exciter 120 has a mechanical resonance frequency greater than 1.5 times the frequency of the tube section in the third mode of vibration. In that case, the exciter frequency is not optimal, but acceptable, the problem associated with low frequencies does not arise, and the exciter becomes more compact than with a below-resonance setting.

In single-tube installation Coriolis flow sensors as shown in FIGS. 7 to 10, 13, 15, and 16, if the respective sensor support is made of the same material as the measuring tube and has the same diameter and the same wall thickness as the measuring tube, the length of the portion of the respective sensor support protruding from the associated isolating body is 3/10 of the length of the tube section, regardless of the length of the latter.

The pipes, measuring tubes, and tube sections shown in the figures of the drawings are, of course, circular cylindrical as usual. The polygonal representation in the provisional figures is due to the fact that these figures were drawn using a computer system that can represent circles only as polygons.

What is claimed is:

1. A method based on the Coriolis principle for measuring the mass flow rate of fluids one of which flows at least temporarily through a pre-existing, permanently installed pipe having a lumen, said method comprising the steps of:

fixing a first and second isolating body having identical masses to an outside surface of the permanently installed pipe at a predetermined distance L from each other to define a measuring length forming a pipe section, each of the identical masses being at least five times as great as the mass of the pipe section;

attaching in the middle of the pipe section a vibration exciter which excites the pipe section in a third mode of vibration, in a first plane containing an axis of the pipe section, at a frequency f which, if the pipe section is filled with one of the fluids, lies between approximately 500 Hz and 1000 Hz;

said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe section,
$r_i$ is the inside diameter of the pipe section,
E is the modulus of elasticity of the material of the pipe section,
$d_M$ is the product of the density of the material of the pipe section and the cross-sectional area of the wall of the pipe section, and
$d_F$ is the product of the mean density of the fluids and the cross-sectional area of the lumen of the pipe;

each of said isolating bodies having a first axis lying in the first plane, a second axis identical with the axis of the pipe section, and a third axis perpendicular to the first and second axes, and having an areal moment of inertia about the first axis which is at least one order of magnitude less than its areal moment of inertia about the third axis;

fixing a first acceleration sensor and a second acceleration sensor to the pipe section at respective positions where, if the pipe section is excited in the third mode of vibration, a deflection of the pipe section caused by a disturbance originating from the pipe has a first zero and a second zero, respectively;

determining a phase difference between a first sensor signal provided by the first acceleration sensor and a second sensor signal provided by the second acceleration sensor; and deriving therefrom a signal proportional to the mass flow rate.

2. A method as claimed in claim 1 wherein:

the first and second isolating bodies are so designed and arranged that the first isolating body consists of
a first fixing piece,
a first intermediate piece
a second intermediate piece,
a first squared end piece, and
a second squared end piece, that the second isolating body consists of
a second fixing piece,
a third intermediate piece,
a fourth intermediate piece,
a third squared end piece, and
a fourth squared end piece, that a respective longitudinal axis of the four squared end pieces is parallel to the axis of the pipe section or the measuring tube, that the longitudinal axes of the first and second squared end pieces and the axis of the pipe section or the measuring tube lie in a second plane perpendicular to the first plane, that the longitudinal axes of the third and fourth squared end pieces and the axis of the pipe section or the measuring tube lie in the second plane, that the respective intermediate piece has a substantially smaller cross section than the respective squared end piece, and that the respective fixing piece is fixed to the pipe or the measuring tube.

3. A method as claimed in claim 2 wherein a straight measuring tube is used.

4. A method as claimed in claim 3 wherein the vibration exciter is an electrodynamic exciter with a seismic mass.

5. A method as claimed in claim 2 wherein a measuring tube with a tube section bent in the first plane is used.

6. A method as claimed in claim 5 wherein the vibration exciter is an electrodynamic exciter with a seismic mass.

7. A method as claimed in claim 2 wherein a measuring tube with a tube section bent in the second plane is used.

8. A method as claimed in claim 7 wherein the vibration exciter is an electrodynamic exciter with a seismic mass.

9. A method as claimed in claim 2 wherein the vibration exciter is an electrodynamic exciter with a seismic mass.

10. A method as claimed in claim 1 wherein a straight measuring tube is used.

11. A method as claimed in claim 4 wherein the vibration exciter is an electrodynamic exciter with a seismic mass.

12. A method as claimed in claim 1 wherein a measuring tube with a tube section bent in the first plan is used.

13. A method as claimed in claim 12 wherein the vibration exciter is an electrodynamic exciter with a seismic mass.

14. A method as claimed in claim 1 wherein a measuring tube with a tube section bent in the second plane is used.

15. A method as claimed in claim 14 wherein the vibration exciter is an electrodynamic exciter with a seismic mass.

16. A method as claimed in claim 1 wherein the vibration exciter is an electrodynamic exciter with a seismic mass.

17. A method based on the Coriolis principle for measuring the mass flow rate of fluids one of which flows at least temporarily through a pre-existing, permanently installed pipe having a lumen, said method comprising the steps of:

fixing a first and second isolating body having identical masses to an outside surface of the permanently installed pipe at a predetermined distance L from each other to define a measuring length forming a pipe section, each of the identical masses being at least five times as great as the mass of the pipe section;

attaching in the middle of the pipe section a vibration exciter which excites the pipe section in a third mode of vibration, in a first plane containing an axis of the pipe section, at a frequency f which, if the pipe section is filled with one of the fluids, lies between approximately 500 Hz and 1000 Hz;

said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe section,
$r_i$ is the inside diameter of the pipe section, E is the modulus of elasticity of the material of the pipe section, $d_M$ is the product of the density of the material of the pipe section and the cross-sectional area of the wall of the pipe section, and $d_F$ is the product of the mean density of the fluids and the cross-sectional area of the lumen of the pipe;

each of said isolating bodies having a first axis lying in the first plane, a second axis perpendicular thereto and identical with the axis of the pipe section, and a third axis perpendicular to the second axis, and having an areal moment of inertia about the first axis which is at least one order of magnitude less than its areal moment of inertia bout the third axis;

fixing to the first isolating body an inlet-side first sensor support having a longitudinal axis extending parallel to the axis of the pipe section;

fixing a first displacement or velocity sensor and a second displacement or velocity sensor to the first sensor support and the second sensor support, respectively, at respective positions where, if the pipe section is excited in the third mode of vibration, a deflection of the first sensor support and the second sensor support caused by a disturbance originating from the pipe has a first zero and a second zero, respectively;

determining a phase difference or time difference between a first sensor signal provided by the first sensor and a second sensor signal provided by the second sensor; and deriving therefrom a signal proportional to the mass flow rate.

18. A method as claimed in claim 17 wherein:

the first and second isolating bodies are so designed and arranged that the first isolating body consists of
a first fixing piece,
a first intermediate piece
a second intermediate piece,
a first squared end piece, and
a second squared end piece, that the second isolating body consists of
a second fixing piece,
a third intermediate piece,
a fourth intermediate piece,
a third squared end piece, and
a fourth squared end piece, that a respective longitudinal axis of the four squared end pieces is parallel to the axis of the pipe section or the measuring tube, that the longitudinal axes of the first and second squared end pieces and the axis of the pipe section or the measuring tube lie in a second plane perpendicular to the first plane, that the longitudinal axes of the third and fourth squared end pieces and the axis of the pipe section or the measuring tube lie in the second plane, that the respective intermediate piece has a substantially smaller cross section than the respective squared end piece, and that the respective fixing piece is fixed to the pipe or the measuring tube.

19. A method as claimed in claim 17 wherein a straight measuring tube is used.

20. A method as claimed in claim 17 wherein a measuring tube with a tube section bent in the first plan is used.

21. A method as claimed in claim 17 wherein a measuring tube with a tube section bent in the second plane is used.

22. A method as claimed in claim 17 wherein the vibration exciter is an electrodynamic exciter with a seismic mass.

23. A method based on the Coriolis principle for measuring the mass flow rate of fluids one of which flows at least temporarily through a first and a second measuring tube each having a lumen, the first and second measuring tubes each being designed to be inserted into a pipe having a lumen, extending parallel to each other, having a respective axis which lies in a first plane, having the same inside and outside diameters as well as the same wall thickness, and being made of the same material, said method comprising the steps of:

clamping a first clamping body and a second clamping body having identical masses onto the first and second measuring tubes at a predetermined distance L from each other to define measuring lengths forming respective sections of the measuring tubes;

attaching at least one vibration exciter in the middle of each of the tube sections which excites the tube sections into oppositely directed vibrations of a third mode in the first plane at a frequency f which, if the tube sections are filled with one of the fluids, lies between approximately 500 Hz and 1000 Hz, said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the pipe, $r_i$ is the inside diameter of the pipe, E is the modulus of elasticity of the material of the pipe, $d_M$ is the product of the density of the material of the pipe and the cross-sectional area of the wall of the pipe, and $d_F$ is the product of the mean density of the fluids and the cross-sectional area of the lumen of the pipe;

fixing a first displacement or velocity sensor and a second displacement or velocity sensor between the tube sections at positions where, if the tube sections are excited in the third mode of vibration, a deflection of the tube sections caused by a disturbance originating from the pipe has a first zero and a second zero, respectively;

determining a phase difference or time difference between a first sensor signal provided by the first sensor and a second sensor signal provided by the second sensor, and deriving therefrom a signal proportional to the mass flow rate.

24. A Coriolis mass flow sensor formed by meant of a preexisting, permanently installed pipe having a lumen through which a fluid flows at least temporarily, characterized in that in order to define a measuring length forming a pipe section, a first isolating body and a second isolating body with identical masses are fixed to an outside surface of the pipe at a predetermined distance L from each other, each of said masses being at least five times as great as the mass of the pipe section, that in the middle of the pipe section, a vibration exciter is fixed which excites the pipe section in a third mode of vibration, in a first plane containing an axis of the pipe section, at a frequency f which, if the pipe section is filled with one of the fluids, lies between approximately 500 Hz and 1000 Hz, said distance L being calculated by the following formula:

$$L{\cdot}5.5{\cdot}2^{1/2}{\cdot}(2\pi f)^{-1/2}{\cdot}\{E(r^4_a-r^4_i)/(d_M+d_F)\}^{-1/4}$$

where
$r_a$ is the outside diameter of the pipe section,
$r_i$ is the inside diameter of the pipe section,
E is the modulus of elasticity of the material of the pipe section,
$d_M$ is the product of the density of the material of the pipe section and the cross-sectional area of the wall of the pipe section, and
$d_F$ is the product of the mean density of the fluids and the cross-sectional area of the lumen of the pipe section;
each of said isolating bodies
having a first axis lying in the first plane, a second axis identical with the axis of the pipe section, and a third axis perpendicular to the first and second axes, and
having an areal moment of inertia about the first axis which is at least one order of magnitude less than its areal moment of inertia about the third axis, and
that a first and a second acceleration sensor are fixed to the pipe section at positions where, if the pipe section is excited in the third mode of vibration, a deflection of the pipe section caused by a disturbance originating from the pipe has a first zero and a second zero, respectively.

25. A Coriolis mass flow sensor as claimed in claim 24 wherein:
the isolating bodies are so designed and arranged
that the first isolating body consists of
a first fixing piece,
a first intermediate piece,
a second intermediate piece,
a first squared end piece, and
a second squared end piece,
that the second isolating body consists of
a second fixing piece,
a third intermediate piece,
a fourth intermediate piece,
a third squared end piece, and
a fourth squared end piece,
that a respective longitudinal axis of the four squared end pieces is parallel to the axis of the pipe or tube section,
that the longitudinal axes of the first and second squared end pieces and the axis of the pipe or tube section lie in a second plane perpendicular to the first plane,
that the longitudinal axes of the third and fourth squared end pieces and the axis of the pipe or tube section lie in the second plane,
that the respective intermediate piece has a substantially smaller cross section than the respective squared end piece, and
that the respective fixing piece is fixed to the pipe or the measuring tube.

26. A Coriolis mass flow sensor as claimed in claim 25 wherein the measuring tube is straight.

27. A Coriolis mass flow sensor as claimed in claim 26 wherein the vibration exciter is an electrodynamic exciter with a seismic mass.

28. A Coriolis mass flow sensor as claimed in claim 27 wherein the vibration exciter is an electrodynamic exciter with a seismic mass.

29. A Coriolis mass flow sensor as claimed in claim 25 wherein the measuring tube is bent between the isolating bodies in the first plane.

30. A Coriolis mass flow sensor as claimed in claim 29 wherein the vibration exciter is an electrodynamic exciter with a seismic mass.

31. A Coriolis mass flow sensor as claimed in claim 25 wherein the measuring tube is bent between the isolating bodies in the second plane.

32. A Coriolis mass flow sensor as claimed in claim 31 wherein the vibration exciter is an electrodynamic exciter with a seismic mass.

33. A Coriolis mass flow sensor as claimed in claim 24 wherein the measuring tube is straight.

34. A Coriolis mass flow sensor as claimed in claim 33 wherein the vibration exciter is an electrodynamic exciter with a seismic mass.

35. A Coriolis mass flow sensor as claimed in claim 34 wherein the vibration exciter is an electrodynamic exciter with a seismic mass.

36. A Coriolis mass flow sensor as claimed in claim 24 wherein the measuring tube is bent between the isolating bodies in the first plane.

37. A Coriolis mass flow sensor as claimed in claim 36 wherein the vibration exciter is an electrodynamic exciter with a seismic mass.

38. A Coriolis mass flow sensor as claimed in claim 24 wherein the measuring tube is bent between the isolating bodies in the second plane.

39. A Coriolis mass flow sensor as claimed in claim 38 wherein the vibration exciter is an electrodynamic exciter with a seismic mass.

40. A Coriolis mass flow sensor formed by means of a preexisting, permanently installed pipe having a lumen through which a fluid flows at least temporarily, characterized in
that in order to define a measuring length forming a pipe section, a first isolating body and a second isolating body with identical masses are fixed to an outside surface of the pipe at a predetermined distance L from each other, each of said identical masses being at least five times as great as the mass of the pipe section,
that in the middle of the pipe section, a vibration exciter is fixed
which excites the pipe section in a third mode of vibration, in a first plane containing an axis of the pipe section, at a frequency f which, if the pipe section is filled with one of the fluids, lies between approximately 500 Hz and 1000 Hz,
said distance L being calculated by the following formula:

$$L=5.5{\cdot}2^{1/2}{\cdot}(2\pi f)^{-1/2}{\cdot}\{E(r^4_a-r^4_i)/(d_M+d_F)\}^{-1/4}$$

where
$r_a$ is the outside diameter of the pipe section,
$r_i$ is the inside diameter of the pipe section,
E is the modulus of elasticity of the material of the pipe section,
$d_M$ is the product of the density of the material of the pipe section and the cross-sectional area of the wall of the pipe section, and
$d_F$ is the product of the mean density of the fluids and the cross-sectional area of the lumen of the pipe section;
each of said isolating bodies
having a first axis lying in the first plane, a second axis perpendicular thereto and identical with the axis of the pipe section, and a third axis perpendicular to the first and second axes, and having an areal moment of inertia about the first axis which is at least one order of magnitude less than its areal moment of inertia about the third axis, that the first isolating body has an inlet-side first sensor support fixed thereto, a longitudinal axis of which is parallel to the axis of the pipe section, that the second isolating body has an outlet-side second sensor support fixed thereto, a longitudinal axis of which is parallel to the axis of the pipe section, and that a first displacement or velocity sensor and a second displacement or velocity sensor are fixed to the first and second sensor supports, respectively, at positions where, if the pipe section Is excited in the third mode of vibration, a deflection of the pipe section caused by a disturbance originating from the pipe has a first zero and a second zero, respectively.

41. A Coriolis mass flow sensor as claimed in claim 20 wherein:

the isolating bodies are so designed and arranged
that the first isolating body consists of
a first fixing piece,
a first intermediate piece,
a second intermediate piece,
a first squared end piece, and
a second squared end piece,
that the second isolating body consists of
a second fixing piece,
a third intermediate piece.
a fourth intermediate piece,
a third squared end piece, and
a fourth squared end piece,
that a respective longitudinal axis of the four squared end pieces is parallel to the axis of the pipe or tube section,
that the longitudinal axes of the first and second squared end pieces and the axis of the pipe or tube section lie in a second plane perpendicular to the first plane,
that the longitudinal axes of the third and fourth squared end pieces and the axis of the pipe or tube section lie in the second plane,
that the respective intermediate piece has a substantially smaller cross section than the respective squared end piece, and
that the respective fixing piece is fixed to the pipe or the measuring tube.

42. A Coriolis mass flow sensor as claimed in claim 40 wherein the measuring tube is straight.

43. A Coriolis mass flow sensor as claimed in claim 40 wherein the measuring tube is bent between the isolating bodies in the first plane.

44. A Coriolis mass flow sensor as claimed in claim 40 wherein the measuring tube is bent between the isolating bodies in the second plane.

45. A Coriolis mass flow sensor designed to be inserted into a pipe having a lumen through which a fluid flows at least temporarily, comprising a single measuring tube having a lumen to an outside surface of which a first and a second isolating body having identical masses are fixed at a predetermined distance L from each other to define a measuring length forming a tube section, each of said identical masses being at least five times as great as the mass of the tube section, to which a vibration exciter is fixed in the middle of the tube section which excites the tube section in a third mode of vibration, in a first plane containing an axis of the tube section, at a frequency f which, if the tube section is filled with one of the fluids, lies between approximately 500 Hz and 1000 Hz, said distance L being calculated by the following formula:

$$L = 5.5 \cdot 2^{1/2} \cdot (2\pi f)^{-1/2} \cdot \{E(r^4_a - r^4_i)/(d_M + d_F)\}^{-1/4}$$

where
$r_a$ is the outside diameter of the tube section,
$r_i$ is the inside diameter of the tube section,
E is the modulus of elasticity of the material of the tube section,
$d_M$ is the product of the density of the material of the tube section and the cross-sectional area of the wall of the tube section, and p2 $d_F$ is the product of the mean density of the fluids and the cross-sectional area of the lumen of the tube section;

each of said isolating bodies
having a first axis lying in the first plane, a second axis perpendicular thereto and identical with the axis of the tube section, and a third axis perpendicular to the first and second axes, and having an areal moment of inertia about the first axis which is at least one order of magnitude less than its areal moment of inertia about the third axis, with a first and a second acceleration sensor being fixed to the tube sections at positions where, if the tube section is excited in the third mode of vibration, a deflection of the tube section caused by a disturbance originating from the pipe as a first zero and a second zero, respectively.

46. A Coriolis mass flow sensor as claimed in claim 45 wherein:

the isolating bodies are so designed and arranged
that the first isolating body consists of
a first fixing piece,
a first intermediate piece,
a second intermediate piece,
a first squared end piece, and
a second squared end piece,
that the second isolating body consists of
a second fixing piece,
a third intermediate piece,
a fourth intermediate piece,
a third squared end piece, and
a fourth squared end piece,
that a respective longitudinal axis of the four squared end pieces is parallel to the axis of the pipe or tube section,
that the longitudinal axes of the first and second squared end pieces and the axis of the pipe or tube section lie in a second plane perpendicular to the first plane,
that the longitudinal axes of the third and fourth squared end pieces and the axis of the pipe or tube section lie in the second plane,
that the respective intermediate piece has a substantially smaller cross section than the respective squared end piece, and
that the respective fixing piece is fixed to the pipe or the measuring tube.

47. A Coriolis mass flow sensor as claimed in claim 45 wherein the measuring tube is straight.

48. A Coriolis mass flow sensor as claimed in claim 45 wherein the measuring tube is bent between the isolating bodies in the first plane.

49. A Coriolis mass flow sensor as claimed in claim 45 wherein the measuring tube is bent between the isolating bodies in the second plane.

50. A Coriolis mass flow sensor designed to be inserted into a pipe having a lumen through which a fluid flows a least temporarily, comprising a single measuring tube having a lumen
- to an outside surface of which a first and a second isolating body having identical masses are fixed at a predetermined distance L from each other to define a measuring length forming a tube section, each of said identical masses being at least five times as great as the mass of the tube section,
- to which a vibration exciter is fixed in the middle of the tube section
  - which excites the tube section in a third mode of vibration, in a first plane containing an axis of the tube section, at a frequency f which, if the tube section is filled with one of the fluids, lies between approximately 500 Hz and 100 Hz,
- said distance L being calculated by the following formula:

$$L = 5.5 \cdot 2^{1/2} \cdot (2\pi f)^{-1/2} \cdot \{E(r^4_a - r^4_i)/(d_M + d_F)\}^{-1/4}$$

where
- $r_a$ is the outside diameter of the tube section,
- $r_i$ is the inside diameter of the tube section,
- E is the modulus of elasticity of the material of the tube section,
- $d_M$ is the product of the density of the material of the tube section and the cross-sectional area of the wall of the tube section, and
- $d_F$ is the product of the mean density of the fluids and the cross-sectional area of the lumen of the tube section;

each of said isolating bodies
- having a first axis lying in the first plane, an axis perpendicular thereto and identical with the axis of the tube section, and a third axis perpendicular to the first and second axes, and
- having an areal moment of inertia about the first axis which is at least one order of magnitude less than its areal moment of inertia about the third axis, the first isolating body having an inlet-side first sensor support fixed thereto,
- a longitudinal axis of which is parallel to the axis of the measuring tube, the second isolating body having an outlet-side second sensor support fixed thereto,
- a longitudinal axis of which is parallel to the axis of the measuring tube, and a first displacement or velocity sensor and a second displacement or velocity sensor being fixed to the first and second sensor supports, respectively, at positions where, if the tube section is excited in the third mode of vibration, a deflection of the first and second sensor supports caused by a disturbance originating from the pipe has a first zero and a second zero, respectively.

51. A Coriolis mass flow sensor as claimed in claim 50 wherein:
the isolating bodies are so designed and arranged
that the first isolating body consists of
a first fixing piece,
a first intermediate piece,
a second intermediate piece,
a first squared end piece, and
a second squared end piece,
that the second isolating body consists of
a second fixing piece,
a third intermediate piece.
a fourth intermediate piece,
a third squared end piece, and
a fourth squared end piece,
that a respective longitudinal axis of the four squared end pieces is parallel to the axis of the pipe or tube section,
that the longitudinal axes of the first and second squared end pieces and the axis of the pipe or tube section lie in a second plane perpendicular to the first plane,
that the longitudinal axes of the third and fourth squared end pieces and the axis of the pipe or tube section lie in the second plane,
that the respective intermediate piece has a substantially smaller cross section than the respective squared end piece, and
that the respective fixing piece is fixed to the pipe or the measuring tube.

52. A Coriolis mass flow sensor as claimed in claim 50 wherein the measuring tube is straight.

53. A Coriolis mass flow sensor as claimed in claim 50 wherein the measuring tube is bent between the isolating bodies in the first plane.

54. A Coriolis mass flow sensor as claimed in claim 50 wherein the measuring tube is bent between the isolating bodies in the second plane.

55. A Coriolis mass flow sensor designed to be inserted into a pipe having a lumen through which a fluid flows at least temporarily, comprising a first and a second measuring tube
which extend parallel to each other and which each have a lumen,
which extend parallel to each other,
a respective axis of which lies in a first plane,
which have the same inside and outside diameters as well as the same wall thickness,
which are made of the same material,
onto each of which a first and a second clamping body having identical masses are clamped at a predetermined distance L from each other to define measuring lengths forming respective sections of the measuring tubes, and
to which at least one vibration exciter is attached in the middle of the respective tube section
which excites the tube sections into oppositely directed vibrations of a third mode in the first plane at a frequency f which, if the tube sections are filled with one of the fluids, lies between approximately 500 Hz and 1000 Hz,
said distance L being calculated by the following formula:

$$L = 5.5 \cdot 2^{1/2} \cdot (2\pi f)^{-1/2} \cdot \{E(r^4_a - r^4_i)/(d_M + d_F)\}^{-1/4}$$

where
- $r_a$ is the outside diameter of the pipe or tube section,
- $r_i$ is the inside diameter of the pipe or tube section,
- E is the modulus of elasticity of the material of the pipe or tube section,
- $d_M$ is the product of the density of the material of the pipe or tube section and the cross-sectional area of the wall of the pipe or tube section, and $d_F$ is the product of the mean density of the fluids and the cross-sectional area of the lumen of the pipe or tube section;

with a first displacement or velocity sensor and a second displacement or velocity sensor being fixed to the tube sections at positions where, if the tube sections are excited in the third mode of vibration, a deflection of the tube sections caused by a disturbance originating from the pipe has a first zero and a second zero, respectively.

56. A method based on the Coriolis principle for measuring the mass flow rate of fluids one of which flows at least temporarily through a single measuring tube to be inserted into a pipe, the measuring tube having a lumen, and the pipe having a lumen and flanges for connecting the pipe to a permanently installed pipe, said method comprising the steps of:

fixing a first and second isolating body having identical masses to an outside surface of the measuring tube at a predetermined distance L from each other to define a measuring length forming a tube section, each of the identical masses being at least five times as great as the mass of the tube section;

inserting the measuring tube into the pipe;

attaching in the middle of the tube section a vibration exciter which excites the tube section in a third mode of vibration, in a first plane containing an axis of the tube section, at a frequency f which, if the tube section is filled with one of the fluids, lies between approximately 500 Hz and 1000 Hz;

said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where $r_a$ is the outside diameter of the tube section,
$r_i$ is the inside diameter of the tube section,
E is the modulus of elasticity of the material of the tube section,
$d_M$ is the product of the density of the material of the tube section and the cross-sectional area of the wall of the tube section, and
$d_F$ is the product of the mean density of the fluids and the cross-sectional area of the lumen of the tube section;

each of said isolating bodies
having a first axis lying in the first plane, a second axis identical with the axis of the tube section, and a third axis perpendicular to the first and second axes, and
having an areal moment of inertia about the first axis which is at least one order of magnitude less than its areal moment of inertia about the third axis;

fixing a first acceleration sensor and a second acceleration sensor to the tube section at respective positions where, if the tube section is excited in the third mode of vibration, a deflection of the tube section caused by a disturbance originating from the pipe has a first zero and a second zero, respectively;

determining a phase difference between a first sensor signal provided by the first acceleration sensor and a second sensor signal provided by the second acceleration sensor; and deriving therefrom a signal proportional to the mass flow rate.

57. A method as claimed in claim 56 wherein:
the first and second isolating bodies are so designed and arranged
that the first isolating body consists of
a first fixing piece,
a first intermediate piece
a second intermediate piece,
a first squared end piece, and
a second squared end piece,
that the second isolating body consists of
a second fixing piece,
a third intermediate piece,
a fourth intermediate piece,
a third squared end piece, and
a fourth squared end piece,
that a respective longitudinal axis of the four squared end pieces is parallel to the axis of the pipe section or the measuring tube,
that the longitudinal axes of the first and second squared end pieces and the axis of the pipe section or the measuring tube lie in a second plane perpendicular to the first plane,
that the longitudinal axes of the third and fourth squared end pieces and the axis of the pipe section or the measuring tube lie in the second plane,
that the respective intermediate piece has a substantially smaller cross section than the respective squared end piece, and
that the respective fixing piece is fixed to the pipe or the measuring tube.

58. A method as claimed in claim 57 wherein a straight measuring tube is used.

59. A method as claimed in claim 58 wherein the vibration exciter is an electrodynamic exciter with a seismic mass.

60. A method as claimed in claim 57 wherein a measuring tube with a tube section bent in the first plane is used.

61. A method as claimed in claim 60 wherein the vibration exciter is an electrodynamic exciter with a seismic mass.

62. A method is claimed in claim 57 wherein a measuring tube with a tube section bent in the second plane is used.

63. A method as claimed in claim 62 wherein the vibration exciter is an electrodynamic exciter with a seismic mass.

64. A method as claimed in claim 57 wherein the vibration exciter is an electrodynamic exciter with a seismic mass.

65. A method as claimed in claim 56 wherein a straight measuring tube is used.

66. A method as claimed in claim 56 wherein a measuring tube with a tube section bent in the first plan is used.

67. A method is claimed in claim 66 wherein the vibration exciter is an electrodynamic exciter with a seismic mass.

68. A method as claimed in claim 65 wherein the vibration exciter is an electrodynamic exciter with a seismic mass.

69. A method as claimed in claim 56 wherein a measuring tube with a tube section bent in the second plane is used.

70. A method as claimed in claim 69 wherein the vibration exciter is an electrodynamic exciter with a seismic mass.

71. A method as claimed in claim 56 wherein the vibration exciter is an electrodynamic exciter with a seismic mass.

72. A method based on the Coriolis principle for measuring the mass flow rate of fluids one of which flows at least temporarily through a single measuring tube to be inserted into a pipe, the measuring tube having a lumen, and the pipe having a lumen and flanges for connecting the pipe to a permanently installed pipe, said method comprising the steps of:

fixing a first and second isolating body having identical masses to an outside surface of the measuring tube at a predetermined distance L from each other to define a measuring length forming a tube section, each of the identical masses being at least five times as great as the mass of the tube section;

inserting the measuring tube into the pipe;

attaching in the middle of the tube section a vibration exciter
which excites the tube section in a third mode of vibration, in a first plane containing an axis of the tube section, at a frequency f which, if the tube section is filled with one of the fluids, lies between approximately 500 Hz and 1000 Hz;

said distance L being calculated by the following formula:

$$L = 5.5 \cdot 2^{1/2} \cdot (2\pi f)^{-1/2} \cdot \{E(r_a^4 - r_i^4)/(d_M + d_F)\}^{-1/4}$$

where
$r_a$ is the outside diameter of the tube section,
$r_i$ is the inside diameter of the tube section,
E is the modulus of elasticity of the material of the tube section,
$d_M$ is the product of the density of the material of the tube section and the cross-sectional area of the wail of the tube section, and
$d_F$ is the product of the mean density of the fluids and the cross-sectional area of the lumen of the measuring tube;

each of said isolating bodies
having a first axis lying in the first plane, a second axis perpendicular thereto and identical with the axis of the tube section, and a third axis perpendicular to the second axis, and
having an areal moment of inertia about the first axis which is at least one order of magnitude less than its areal moment of inertia bout the third axis;

fixing to the first isolating body an inlet-side first sensor support
having a longitudinal axis extending parallel to the axis of the tube section;

fixing a first displacement or velocity sensor and a second displacement or velocity sensor to the first sensor support and the second sensor support, respectively, at respective positions where, if the tube section is excited in the third mode of vibration, a deflection of the first sensor support and the second sensor support caused by a disturbance originating from the pipe has a first zero and a second zero, respectively, determining a phase difference or time difference between a first sensor signal provided by the first sensor and a second sensor signal provided by the second sensor; and deriving therefrom a signal proportional to the mass flow rate.

73. A method as claimed in claim 72 wherein a straight measuring tube is used.

74. A method as claimed in claim 72 wherein a measuring tube with a tube section bent in the first plan is used.

75. A method as claimed in claim 72 wherein a measuring tube with a tube section bent in the second plane is used.

76. A method as claimed in claim 72 wherein the vibration exciter is an electrodynamic exciter with a seismic mass.

* * * * *